(12) United States Patent
Brabec

(10) Patent No.: US 8,441,228 B2
(45) Date of Patent: May 14, 2013

(54) BI-DIRECTIONAL BATTERY VOLTAGE CONVERTER

(75) Inventor: Ladislaus Joseph Brabec, Savage, MN (US)

(73) Assignee: Thermo King Corporation, Minneapolis, MN (US)

( * ) Notice: Subject to any disclaimer, the term of this patent is extended or adjusted under 35 U.S.C. 154(b) by 254 days.

(21) Appl. No.: 12/845,812

(22) Filed: Jul. 29, 2010

(65) Prior Publication Data

US 2011/0025124 A1    Feb. 3, 2011

Related U.S. Application Data

(60) Provisional application No. 61/230,296, filed on Jul. 31, 2009, provisional application No. 61/315,759, filed on Mar. 19, 2010.

(51) Int. Cl.
*H02J 7/00*          (2006.01)
*H02J 7/14*          (2006.01)

(52) U.S. Cl.
USPC .............................. 320/104; 307/10.7; 180/65

(58) Field of Classification Search ................... 320/104
See application file for complete search history.

(56) References Cited

U.S. PATENT DOCUMENTS

| | | |
|---|---|---|
| 4,114,082 A | 9/1978 | Scheidler |
| 4,575,680 A | 3/1986 | Gold |
| 4,894,765 A | 1/1990 | Kahkipuro |
| 4,996,637 A | 2/1991 | Piechnick |
| 5,057,762 A * | 10/1991 | Goedken et al. ............... 320/116 |
| 5,080,059 A | 1/1992 | Yoshida et al. |
| 5,091,688 A | 2/1992 | Ewald et al. |
| 5,264,777 A | 11/1993 | Smead |
| 5,283,511 A | 2/1994 | Keener et al. |
| 5,418,444 A | 5/1995 | Cook et al. |
| 5,488,283 A * | 1/1996 | Dougherty et al. .......... 307/10.1 |
| 5,631,534 A | 5/1997 | Lewis |
| 5,656,915 A | 8/1997 | Eaves |
| 5,669,470 A | 9/1997 | Ross |
| 5,691,576 A | 11/1997 | Minks |
| 5,693,986 A | 12/1997 | Vettraino, Jr. et al. |

(Continued)

FOREIGN PATENT DOCUMENTS

| | | |
|---|---|---|
| GB | 2239359 | 6/1991 |
| JP | 2004248424 | 9/2004 |

(Continued)

OTHER PUBLICATIONS

International Search Report and Written Opinion for Application No. PCT/US2010/043611 dated Mar. 24, 2011 (11 pages).

(Continued)

*Primary Examiner* — Samuel Berhanu
(74) *Attorney, Agent, or Firm* — Michael Best & Friedrich LLP

(57) ABSTRACT

A battery module for use with a vehicle electrical system. The battery module includes a bi-directional battery voltage converter, a first battery, and a second battery. A first relay selectively connects the first battery to the bi-directional battery voltage converter. A second relay selectively connecting the second battery to the bi-directional battery voltage converter. A controller selectively energizes the first relay, selectively energizes the second relay, and controls a direction of current through the bi-directional battery voltage converter.

16 Claims, 14 Drawing Sheets

U.S. PATENT DOCUMENTS

| | | | |
|---|---|---|---|
| 5,726,553 | A | 3/1998 | Waugh |
| 5,818,201 | A * | 10/1998 | Stockstad et al. ............ 320/119 |
| 5,844,325 | A | 12/1998 | Waugh et al. |
| 5,859,525 | A | 1/1999 | Minks |
| 5,905,360 | A | 5/1999 | Ukita |
| 5,929,604 | A | 7/1999 | Irvin |
| 5,936,314 | A | 8/1999 | Suganuma et al. |
| 5,960,898 | A | 10/1999 | Okada et al. |
| 6,043,629 | A | 3/2000 | Ashley et al. |
| 6,049,140 | A | 4/2000 | Alksnat et al. |
| 6,114,835 | A | 9/2000 | Price |
| 6,204,636 | B1 | 3/2001 | Kinoshita et al. |
| 6,229,279 | B1 | 5/2001 | Dierker |
| 6,268,711 | B1 | 7/2001 | Bearfield |
| 6,297,616 | B1 | 10/2001 | Kubo et al. |
| 6,320,358 | B2 | 11/2001 | Miller |
| 6,323,608 | B1 | 11/2001 | Ozawa |
| 6,342,775 | B1 | 1/2002 | Sleder, Sr. |
| 6,384,489 | B1 | 5/2002 | Bluemel et al. |
| 6,515,456 | B1 | 2/2003 | Mixon |
| 6,700,802 | B2 | 3/2004 | Ulinski et al. |
| 6,741,065 | B1 | 5/2004 | Ishii et al. |
| 6,762,513 | B2 | 7/2004 | Landgraf et al. |
| 6,798,670 | B2 | 9/2004 | King |
| 6,836,094 | B1 | 12/2004 | Bender |
| 6,873,134 | B2 | 3/2005 | Canter et al. |
| 6,919,707 | B2 | 7/2005 | Kawai et al. |
| 6,919,711 | B2 | 7/2005 | Haydock et al. |
| 6,924,621 | B2 | 8/2005 | Jabaji et al. |
| 6,989,653 | B2 | 1/2006 | Iwata et al. |
| 7,009,366 | B2 | 3/2006 | Maehara |
| 7,019,488 | B2 | 3/2006 | Nakao |
| 7,116,078 | B2 | 10/2006 | Colombo et al. |
| 7,116,085 | B2 | 10/2006 | Ikezawa |
| 7,157,806 | B2 | 1/2007 | Jabaji et al. |
| 7,221,064 | B2 | 5/2007 | Okuda et al. |
| 7,245,108 | B2 | 7/2007 | Chertok et al. |
| 7,279,867 | B2 | 10/2007 | Benckenstein, Jr. et al. |
| 7,298,119 | B1 | 11/2007 | Amram Summit et al. |
| 7,329,966 | B2 | 2/2008 | Konishi |
| 7,352,143 | B2 | 4/2008 | Inaba et al. |
| 7,352,154 | B2 | 4/2008 | Cook |
| 7,378,818 | B2 | 5/2008 | Fowler et al. |
| 7,389,189 | B2 | 6/2008 | Williams et al. |
| 7,397,147 | B2 | 7/2008 | Jabaji et al. |
| 7,407,025 | B2 | 8/2008 | Urakabe et al. |
| 7,474,518 | B2 | 1/2009 | Rutz et al. |
| 7,477,493 | B2 | 1/2009 | Sumimoto et al. |
| 7,528,582 | B1 | 5/2009 | Ferguson |
| 7,538,532 | B2 | 5/2009 | Hack et al. |
| 7,936,083 | B2 | 5/2011 | Stancu et al. |
| 2003/0107861 | A1 | 6/2003 | Hazelton |
| 2004/0041403 | A1 | 3/2004 | Fattic |
| 2004/0062059 | A1 | 4/2004 | Cheng et al. |
| 2005/0029867 | A1 | 2/2005 | Wood |
| 2005/0084745 | A1 | 4/2005 | Colello et al. |
| 2005/0151509 | A1 * | 7/2005 | Cook ............................ 320/116 |
| 2005/0285445 | A1 | 12/2005 | Wruck et al. |
| 2006/0055367 | A1 | 3/2006 | Iwata et al. |
| 2006/0278450 | A1 | 12/2006 | Shirasaka et al. |
| 2007/0009770 | A1 | 1/2007 | Takada et al. |
| 2007/0166574 | A1 | 7/2007 | Nakashima et al. |
| 2007/0247106 | A1 | 10/2007 | Kawahara et al. |
| 2007/0279003 | A1 | 12/2007 | Altemose et al. |
| 2008/0030167 | A1 | 2/2008 | Hsu et al. |
| 2008/0055951 | A1 | 3/2008 | Schreiber |
| 2008/0062724 | A1 | 3/2008 | Feng et al. |
| 2008/0079389 | A1 | 4/2008 | Howell et al. |
| 2008/0084182 | A1 | 4/2008 | Oberlin et al. |
| 2008/0129115 | A1 | 6/2008 | Baumann et al. |
| 2008/0174274 | A1 | 7/2008 | Kosaka et al. |
| 2008/0191663 | A1 | 8/2008 | Fowler et al. |
| 2008/0203966 | A1 | 8/2008 | Ward |
| 2008/0219032 | A1 | 9/2008 | Stancu et al. |
| 2008/0285193 | A1 | 11/2008 | Watanabe et al. |
| 2008/0304292 | A1 | 12/2008 | Zeng et al. |
| 2008/0315683 | A1 | 12/2008 | Jabaji et al. |
| 2009/0039707 | A1 | 2/2009 | Ishizeki |
| 2009/0051337 | A1 | 2/2009 | Yoshida et al. |
| 2009/0078481 | A1 | 3/2009 | Harris |
| 2009/0091295 | A1 | 4/2009 | Wan |
| 2009/0108677 | A1 | 4/2009 | Walter et al. |
| 2009/0127930 | A1 | 5/2009 | Senda |
| 2009/0167259 | A1 | 7/2009 | Miyamae |
| 2009/0179616 | A1 | 7/2009 | Ichikawa et al. |
| 2009/0179618 | A1 | 7/2009 | LiTingTun |
| 2009/0184579 | A1 | 7/2009 | Owens et al. |
| 2009/0189570 | A1 | 7/2009 | Abe |
| 2011/0025125 | A1 | 2/2011 | Brabec |
| 2011/0025126 | A1 | 2/2011 | Brabec |
| 2011/0082607 | A1 | 4/2011 | Chorian et al. |

FOREIGN PATENT DOCUMENTS

| | | |
|---|---|---|
| JP | 2005065480 | 3/2005 |
| JP | 2006333662 | 12/2006 |
| WO | WO 2011/014593 | 2/2011 |
| WO | WO 2011/014595 | 2/2011 |
| WO | WO 2011/014597 | 2/2011 |

OTHER PUBLICATIONS

International Search Report and Written Opinion for Application No. PCT/US2010/043613 dated Mar. 2, 2011 (9 pages).

International Search Report and Written Opinion for Application No. PCT/US2010/043609 dated Mar. 14, 2011 (11 pages).

United States Patent Office Action for U.S. Appl. No. 12/845,838 dated Sep. 24, 2012 (17 pages).

United States Patent Office Action for U.S. Appl. No. 12/845,819 dated Jan. 7, 2013 (16 pages).

* cited by examiner

BI-DIRECTIONAL BATTERY VOLTAGE CONVERTER

RELATED APPLICATIONS

This application claims priority to U.S. Provisional Patent Application No. 61/230,296 filed on Jul. 31, 2009, and U.S. Provisional Patent Application No. 61/315,759 filed on Mar. 19, 2010, each of which is incorporated herein by reference in its entirety.

BACKGROUND

The invention relates to a control system for electrical storage elements of a vehicle, and in one particular embodiment, to a system for controlling power into and out of the electrical storage elements.

Large vehicles (e.g., semi-tractors, trucks, buses, etc.) are commonly used to transport people and cargo. The vehicles include various components that draw electrical power, including for example a heating, ventilation, and air conditioning (HVAC) system for a sleeper unit in a long-distance tractor. The power for these various electrical components may be supplied by an alternator while the vehicle is in operation and by an alternative power source, such as one or more batteries, when the vehicle is not in operation.

In general, electrical energy from a power source, such as the alternator, is stored in one or more batteries of the vehicle to provide stored electrical energy for later use when other power sources are unavailable. In some vehicles, groups of auxiliary batteries are provided for supplying power to electrical components of the vehicle. These groups of auxiliary batteries are often electrically connected to the power source in a parallel relationship to one another.

SUMMARY

In one embodiment, the invention includes a bi-directional battery voltage converter for a vehicle electrical system. The bi-directional battery voltage converter includes at least one battery. Each battery has associated therewith a power source, an inductor, four switches electrically coupled to the inductor where two of the switches are also electrically coupled to the battery and the other two of the switches are electrically coupled to the power source, and a routing circuit connected to each of the switches. The routing circuit controls the opening and closing of each of the switches such that the switches are opened or closed in pairs. By alternately coupling the inductor to the power source and then the battery in a defined duty cycle, the routing circuit charges the inductor using the power source and then transfers the charge stored in the inductor to the battery. In various embodiments, the power source is a vehicle alternator.

In another embodiment, the invention includes a method of individually charging each of a plurality of batteries in a vehicle electrical system. The method includes providing a bi-directional battery voltage converter electrically coupled to each individual battery. The bi-directional battery voltage converter can include a current sensor associated with the inductor and a voltage sensor associated with the battery. The method further includes sensing the voltage of each battery and the current flowing into each battery and adjusting the duty cycle of the bi-directional battery voltage converter to adjust at least one of the current and the voltage being delivered to the battery, so as to provide optimal charging to each individual battery.

In yet another embodiment, the invention includes a method of managing recharging of a plurality of batteries in a vehicle electrical system. The method includes providing an electronic switch electrically coupled to each of a plurality of batteries in a vehicle electrical system and a voltage sensor to sense the voltage of a power source connected to the vehicle electrical system. The method further includes closing a first switch to connect a first of the plurality of batteries to the vehicle electrical system and monitoring the voltage of the power source when the first switch is closed. The method also includes determining whether the voltage has decreased below a threshold level due to the first battery being connected and, if so, reopening the first switch to disconnect the first battery. The method still further includes closing each of the plurality of switches associated with each of the plurality of batteries and monitoring the voltage until all of the switches are closed and all of the batteries are connected to the vehicle electrical system for recharging.

In still another embodiment, the invention includes a method of individually discharging each of a plurality of batteries in a vehicle electrical system. The method includes providing a bi-directional battery voltage converter electrically coupled to each individual battery, where the bi-directional battery voltage converter also includes a current sensor associated with the inductor and a voltage sensor associated with the battery. The method further includes sensing the voltage of each battery and the current provided by each battery, and adjusting the duty cycle of the bi-directional battery voltage converter to adjust at least one of the current and the voltage being delivered by the battery, so as to provide optimal discharging of each individual battery.

In yet another embodiment, the invention includes a method of electrically isolating at least one battery in a vehicle electrical system. The method includes providing an electronic switch electrically coupled to each of a plurality of batteries in a vehicle electrical system. The method further includes, during discharging of the plurality of batteries, opening at least one switch to electrically isolate at least one of the plurality of batteries to preserve charge within the isolated battery.

In still another embodiment, the invention includes a bi-directional multi-battery voltage converter for a vehicle electrical system. Each bi-directional multi-battery voltage converter is associated with a plurality of batteries. A control circuit is provided to selectively energize a relay or electronic switch associated with one of the plurality of batteries, thereby connecting the battery with the bi-directional multi-battery voltage converter.

In still yet another embodiment, the invention provides a method of charging batteries in a vehicle electrical system. The vehicle electrical system has a system bus, a first switch selectively connecting a first battery with the system bus, a second switch selectively connecting a second battery with the system bus, and a controller monitoring a voltage of the vehicle electrical system and controllably opening and closing the first switch and the second switch. The first switch and the second switch are opened, thereby disconnecting the first battery and the second battery from the system bus. The first switch is closed, thereby connecting the first battery with the system bus. The voltage of the vehicle electrical system is monitored in response to the first switch closing. The first switch is opened if the voltage of the vehicle electrical system traverses a threshold value. The second switch is closed, thereby connecting the second battery with the system bus. The voltage of the vehicle electrical system is monitored in response to the second switch closing. The second switch is opened if the voltage of the vehicle electrical system traverses the threshold value.

In still yet another embodiment, the invention provides a controller for use with a vehicle electrical system. The controller has a voltage input terminal, a memory, and a micro-processor. The controller controllably opens a first switch, thereby disconnecting a first battery from a system bus and controllably opens a second switch, thereby disconnecting a second battery from the system bus. The controller controllably closes the first switch, thereby connecting the first battery with the system bus. The controller receives a voltage of the vehicle electrical system at the voltage input terminal in response to the first switch closing. The controller then compares, in the micro-processor, a value related to the voltage of the vehicle electrical system to a threshold value from the memory. The controller controllably opens the first switch in response to the voltage of the vehicle electrical system traversing a threshold value. The controller controllably closes the second switch, thereby connecting a second battery with the system bus. The controller receives a voltage of the vehicle electrical system at the voltage input terminal in response to the second switch closing. The controller then compares, in the micro-processor, a value related to the voltage of the vehicle electrical system to the threshold value, and controllably opens the second switch in response to the voltage of the vehicle electrical system traversing the threshold value.

In still yet another embodiment, the invention provides a vehicle electrical system including a system bus, a first battery, a first switch selectively connecting the first battery to the system bus, a second battery, a second switch selectively connecting the second battery to the electrical system, and a controller. The controller controllably opens the first switch and the second switch, thereby disconnecting the first battery and the second battery from the system bus. The controller controllably closes the first switch, thereby connecting the first battery with the system bus, and monitors a voltage of the vehicle electrical system in response to the first switch closing. The controller controllably opens the first switch if the voltage of the vehicle electrical system traverses a threshold value. The controller controllably closes the second switch, thereby connecting a second battery associated with the second switch with the system bus, and monitors the voltage of the vehicle electrical system in response to the second switch closing. The controller opens the second switch if the voltage of the vehicle electrical system traverses the threshold value.

In still yet another embodiment, the invention provides a method of balancing current in a vehicle electric system. The vehicle electrical system includes a system bus, a first battery, a first bi-directional battery voltage converter selectively transferring a first current between the first battery and the system bus, a second battery, a second bi-directional battery voltage converter selectively transferring a second current between the second battery and the system bus, and a controller controlling the first bi-directional battery voltage converter and the second bi-directional battery voltage converter. The first current is sensed and a first signal related to the first current is provided to the controller. The second current and a second signal related to the second current is provided to the controller. The first bi-directional battery voltage converter and the second bi-directional battery voltage converter are controlled so that the first current and the second current are equal portions of a load current supplied to an electrical load connected to the system bus.

In still yet another embodiment, the invention provides a vehicle electrical system for supplying electrical power to an electrical load. The system includes a system bus, a first battery, and a first bi-directional battery voltage converter controllably transferring a first current between the first battery and the system bus. The system also includes a second battery, and a second bi-directional battery voltage converter controllably transferring a second current between the second battery and the system bus. A controller controls the first bi-directional battery voltage converter and the second bi-directional battery voltage converter such that the first current and the second current are equal portions of a load current supplied to an electrical load connected to the system bus.

In still yet another embodiment, the invention provides a bi-directional battery voltage converter for use with a vehicle electrical system. The bi-directional battery voltage converter includes an inductor, a first switch selectively coupling the inductor to a first battery, a second switch selectively coupling the inductor to the first battery, a third switch selectively coupling the inductor to the vehicle electrical system, and a fourth switch selectively coupling the inductor to the vehicle electrical system. A routing circuit is connected to each of the first, second, third, and fourth switches. The routing circuit controllably opens and closes the switches in pairs such that the inductor is charged from one of the vehicle electrical system and the battery and discharged to the other of the vehicle electrical system and the battery. A controller controls the routing circuit to deliver a portion of a load current supplied to a connected electrical load, the portion based upon the availability of other current sources.

In still yet another embodiment, the invention provides an electrical system for a vehicle. The electrical system includes a system bus, an ignition switch selecting an operational state of the electrical system, and a primary battery connected to the system bus. A first auxiliary battery module is connected to the system bus. The first auxiliary battery module includes a first auxiliary battery, a second auxiliary battery, a bi-directional battery voltage converter, and a module controller selectively connecting one of the first auxiliary battery and the second auxiliary battery to the bi-directional battery voltage converter. A main system controller operates the first auxiliary battery module in one of a null mode, wherein the first auxiliary battery and the second auxiliary battery are disconnected from the electrical system, a charging mode, wherein one of the first auxiliary battery and the second auxiliary battery receives a current via the bi-directional battery voltage converter, and a discharging mode, wherein one of the first auxiliary battery and the second auxiliary battery supplies a current via the bi-directional battery voltage converter.

In still yet another embodiment, the invention provides a battery module for use with a vehicle electrical system. The battery module includes a bi-directional battery voltage converter, a first battery, and a second battery. A first relay selectively connects the first battery to the bi-directional battery voltage converter. A second relay selectively connects the second battery to the bi-directional battery voltage converter. A controller selectively energizes the first relay, selectively energizes the second relay, and controls a direction of current through the bi-directional battery voltage converter.

In still yet another embodiment, the invention provides an electrical system for a vehicle. The electrical system includes a system bus, an ignition switch selecting an operational state of the electrical system, a primary battery connected to the system bus, a first auxiliary battery module and a second auxiliary battery module. The first auxiliary battery module includes a first auxiliary battery, a second auxiliary battery, a first bi-directional battery voltage converter, and a first module controller selectively connecting one of the first auxiliary battery and the second auxiliary battery to the bi-directional battery voltage converter. The second auxiliary battery module includes a third auxiliary battery, a fourth auxiliary battery, a second bi-directional battery voltage converter, and a second module controller selectively connecting one of the first auxiliary battery and the second auxiliary battery to the bi-directional battery voltage converter. A main system controller operates the first auxiliary battery module and the second auxiliary battery module to prioritize a recharging of one of the first, second, third, and fourth auxiliary batteries.

Various aspects of the invention will become apparent by consideration of the detailed description and accompanying drawings.

DETAILED DESCRIPTION

Figure 1:
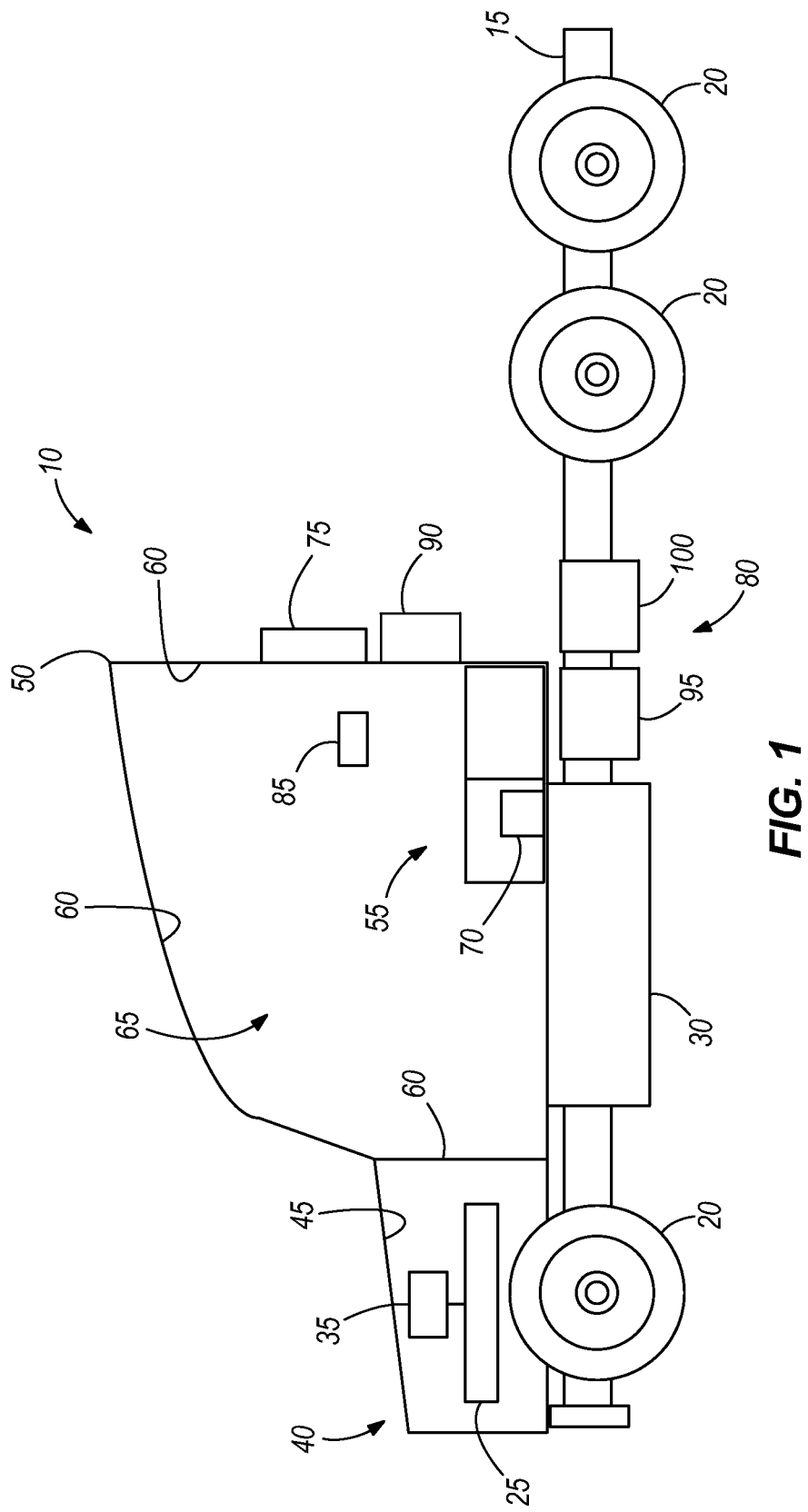
FIG. 1 is a schematic view of a vehicle including a control system, a plurality of electrical storage elements, a power source, and a heating, ventilation, and air conditioning (HVAC) system.

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, unless specified or otherwise limited, "connected" and "coupled" are not restricted to physical or mechanical connections or couplings.

To supply the power needs of a vehicle, including a large vehicle such as a straight truck or a semi-tractor for pulling a trailer, multiple batteries are often coupled together to deliver greater power. In one typical arrangement for coupling multiple batteries, two or more batteries are wired together in parallel until the total power-delivery capacity (e.g. measured in peak amperes at a given voltage, such as 12 volts) is sufficient for supplying the power needs of the vehicle. In another common arrangement, a simple electronic component, such as a battery relay, may be used to electrically couple several batteries together. However, neither of these arrangements provides for individual monitoring and control of each of the batteries, and thus, the arrangements are indifferent to the charging and discharging limitations of individual batteries. Also, the engagement of two or more batteries can create large momentary currents, which are inefficient and which may produce wear on electronic components in the system.

Known battery charging control systems typically charge an entire group of parallel-connected batteries by connecting a single power source (e.g. the alternator of the vehicle) to the entire group of batteries. When these batteries have relatively large charge acceptance capacities (i.e., low internal resistance), the current acceptance of the batteries can exceed the current supplied from the power source. In addition, conventional control systems control the supply voltage to protect against over-current charging conditions, which can be detrimental to battery life. Often, such systems do not provide an appropriate initial amount of current to the batteries, limiting the effective life of the batteries.

By simultaneously charging entire groups of batteries, conventional battery charging control systems typically require that each of the batteries in the group have the same electrical characteristics, including for example internal resistance, tolerances, and architecture. When the electric current demand from each of the batteries exceeds the current capacity of the power source that is charging the batteries, one or both of the power source and the batteries may be damaged or operate inefficiently. Excessive electric current demand from the group of batteries may also provide inadequate charging of the batteries, lowering at least one of the electrical storage capacity of the batteries and the cycling capability of the batteries.

Thus, various embodiments of the invention provide apparatus, systems, and methods for managing the charging and discharging of individual batteries within a group of batteries. Various other embodiments of the invention provide apparatus, systems, and methods for managing the charging and discharging of sub-groups of batteries with a group of batteries.

FIG. 1 shows an exemplary large vehicle embodying the invention, namely a vehicle 10 for over-the-road operation. The illustrated vehicle 10 is a semi-tractor that can be used to transport cargo stored in a cargo compartment (e.g., a container, a trailer, etc.) to one or more destinations. It is also envisioned that the invention may also be embodied in other vehicles such as a straight truck, van, bus, camper, car, motorcycle, boat, train, and aircraft, among other possibilities. In still other constructions, the invention could be implemented in a building or other setting where multiple batteries are employed.

The vehicle 10 includes a frame 15, wheels 20, a prime mover 25, a fuel reservoir 30, and a direct current ("DC") generator or alternator 35. The wheels 20 are rotatably coupled to the frame 15 to permit movement of the vehicle 10. The alternator 35 is coupled to the prime mover 25 so that mechanical energy produced by the prime mover 25 can be converted into electrical energy, i.e. electricity. The prime mover 25 may be an engine that runs on diesel fuel, gasoline, or other suitable material. The alternator 35 and the prime mover 25 cooperate to define a first electrical power source 40 for the vehicle 10. The first power source 40 has a first power capacity that is based on the available electrical power from the alternator 35 at a predetermined voltage (e.g. 12 volts).

In certain constructions, the prime mover 25 may be an electric motor that is powered by an internal or external power supply, for example by wires or rails as in a train system or by storing grid power as in a battery-powered, plug-in electric vehicle. In the latter case of a completely plug-in electric vehicle (i.e. one that does not include an on-board engine to supplement battery power), there may be a particular set of batteries dedicated to storing charge for powering the prime mover 25 during operation of the vehicle 10. The batteries for powering the prime mover 25 during operation of the vehicle may be separate from a set of auxiliary batteries used to power accessories (e.g. lights and HVAC) when the vehicle 10 is not in operation. In other constructions in which the prime mover 25 is an electric motor, the electric motor may be powered by an on-board power source such as a generator, where the generator runs on diesel fuel, gasoline, or other suitable material, as in a hybrid electric vehicle. In the case where the prime mover 25 is an electric motor, power for charging the various batteries may come from the same source that is powering the electric motor, instead of the alternator. In some designs (e.g. an electric vehicle that operates only on grid or battery power), the vehicle may not include an alternator.

The prime mover 25 is coupled to the frame 15 and is disposed in a compartment 45 adjacent a forward end of the vehicle 10. The prime mover 25 is in communication with one or more of the wheels 20 to drive the vehicle 10. The prime mover 25 can be in an "On" state and an "Off" state. When the prime mover 25 is in the "On" state, it may be engaged with the wheels 20. In addition, when the prime mover 25 is in the "On" state, it can provide power to the electrical system of the vehicle 10 to power loads and to charge batteries in the system. When the prime mover 25 is "On" and is engaged with the wheels 20, the vehicle 10 can be driven. If the prime mover 25 is "On" but is not engaged with the wheels 20, the prime mover 25 and the vehicle 10 are said to be idling, although the prime mover 25 in the idling state can still provide power to the electrical system of the vehicle 10.

When the vehicle 10 is not going to be operated for a prolonged period of time (e.g. during an overnight stop or during loading or unloading of cargo), the prime mover 25 may be put into an "Off" state and the vehicle 10 put into standby mode. In the "Off" state, the prime mover 25 is not available to provide power to the electrical system of the vehicle 10. Thus, one or more batteries may be needed to power electrical loads in the vehicle 10.

Referring to FIG. 1, the vehicle 10 also includes a cabin 50 and an electrically powered heating, ventilation, and air conditioning (HVAC) system 55. The HVAC system 55 defines an exemplary electrical load of the vehicle 10. The vehicle 10 also may include other electrical loads (e.g., vehicle accessories, lights, starter motor for prime mover 25, etc.). Generally, the electrical load has power characteristics that relate to a load draw, which corresponds to the electrical power that is necessary for adequately powering the load. In addition, charging of batteries on the vehicle 10 constitutes another type of load.

The cabin 50 is supported on the frame 15 rearward of the compartment 45 and includes walls 60 that define a space 65. In some constructions, the space 65 may be divided into a driving portion and a sleeping portion. The HVAC system 55 is coupled to the vehicle 10 and is in communication with the cabin 50 to condition the space 65. The illustrated vehicle 10 includes a single HVAC system 55 that is located adjacent and in communication with the space 65. In other constructions, the HVAC system 55 can be positioned in the vehicle to condition the sleeping portion, and another HVAC system can be positioned in the vehicle to condition the driving portion. Generally, the number of HVAC systems in the vehicle depends at least in part on the size and number of zones to be conditioned within the cabin.

Components of the HVAC system 55 can be located almost anywhere on the vehicle 10. In the illustrated construction, the HVAC system 55 includes an evaporator assembly 70 that is located in the cabin 50 to condition the space 65, and a condenser assembly 75 that is coupled to one of the walls 60 on an exterior side of the cabin 50 to provide heat exchange between refrigerant in the HVAC system 55 and an ambient environment. In some constructions, the components of the HVAC system 55 can be assembled together into a single, unitary package. In other constructions, each component of the HVAC system 55 can be separate from the other components of the HVAC system 55.

FIG. 1 shows that the vehicle 10 also includes an electrical storage system 80 and a charge control system 85 in communication with the electrical storage system 80. The electrical storage system 80 is in electrical communication with the first power source 40 for receiving electrical power when the prime mover 25 is in the "On" state. The charge control system 85 also may be in selective electrical communication with a second electrical power source 90 in addition to, or in lieu of, the first power source 40 for receiving electrical power from the second power source 90. In the illustrated construction, the second power source 90 can include power from a municipal grid (also called "shore power"), a photovoltaic device, a fuel cell, a wind generator, or other sources of power. Generally, the second power source 90 has a second electrical power capacity that is based on the available electrical power from the power source at a preferred voltage.

The electrical storage system 80 also is in electrical communication with the electrical load of the vehicle (e.g., the HVAC system 55) to provide adequate power to the electrical load based on the load draw. Generally, the electrical storage system 80 receives power from either or both of the first power source 40 and the second power source 90 during a charge phase, and discharges power to the load (or loads) of the vehicle 10 during a discharge phase. A charge phase may occur when either or both of the first and second power sources 40, 90 are inputting power to the electrical system of the vehicle 10, and a discharge phase may occur when neither of the first or second power sources 40, 90 are inputting power to the electrical system of the vehicle 10.

The electrical storage system 80 includes a first plurality of electrical storage elements (e.g. batteries 95) and a second plurality of electrical storage elements (e.g. batteries 100) for storing electrical power from the first power source 40 and/or from the second power source 90 during the charge phase, and for discharging power to the electrical load during the discharge phase. Each of the first power source 40 and the second power source 90 defines a connected power source when the respective power sources 40, 90 are connected to the electrical storage system 80. Each of the first power source 40 and the second power source 90 defines a disconnected power source when the respective power sources 40, 90 are disconnected from the electrical storage system 80. One or both of the first power source 40 and the second power source 90 can be connected to or disconnected from the electrical storage system 80.

In the illustrated construction, the first plurality of batteries 95 comprises existing batteries of the vehicle 10, and the second plurality of batteries 100 comprises separate, additional batteries for the vehicle 10. In other constructions, the first plurality of batteries 95 and the second plurality of batteries 100 may be included on the vehicle 10 as separate batteries that are provided in addition to existing vehicle batteries.

In order to simplify the description, the various constructions described herein focus on charging each of the second plurality of batteries 100. However, the disclosed circuits and methods could also be used to charge each of the first plurality of batteries 95. In addition, the power for charging each of the second plurality of batteries 100 can come from a number of sources, including one or more of the first plurality of batteries 95, the first power source 40, the second power source 90, or various combinations of these and other power sources connected to the vehicle.

A vehicle electrical system according to various constructions includes one or more of the first plurality of batteries 95, the second plurality of batteries 100, one or more electrical loads (e.g. lights or HVAC system 55), and the alternator 35. In addition, the vehicle electrical system can also include the second power source 90. As described further below in regard to FIGS. 2-10, the vehicle electrical system may also include one or both of a bi-directional battery voltage converter 200 and an electronic switch 210 associated with one or more of the first or second plurality of batteries 95, 100. In each embodiment, the common connections between electrical system components may be referred to generally as the electrical system, or system "bus."

Figure 2:
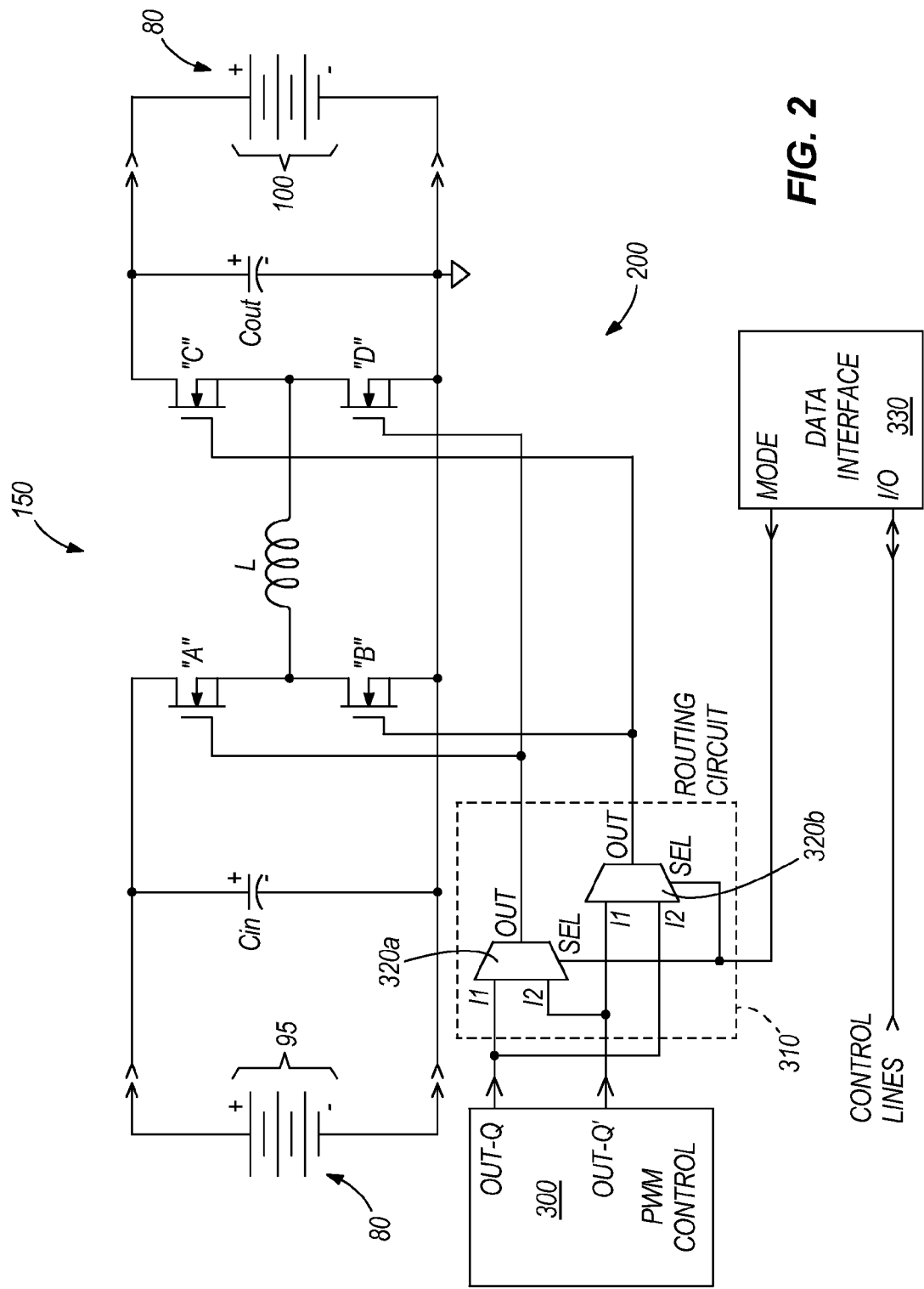
FIG. 2 is a diagram of a portion of a vehicle electrical system, which includes a bi-directional battery voltage converter circuit.

FIG. 2 shows a circuit diagram for a portion of a vehicle electrical system 150 that includes a construction of the bi-directional battery voltage converter 200. The bi-directional battery voltage converter 200 includes four switches A, B, C, D arranged as an "H-bridge" coupled by an inductor L. In various constructions, the switches A, B, C, D are electronically-controlled switches that are capable of carrying large amounts of current, for example field-effect transistor (FET) switches such as metal oxide semiconductor FETs (MOSFETs). Typically, switches are activated in pairs, for example switches A and D are turned on at the same time, or switches B and C are turned on at the same time. When switches A and D are turned on, the inductor L is charged from one or more of the first plurality of batteries 95 (or, alternatively, the first power source 40 or the second power source 90 shown in FIG. 1). Switches A and D are subsequently turned off and switches B and C are turned on, allowing the stored energy from the inductor L to be delivered to one or more of the second plurality of batteries 100.

In some constructions, the switches A, B, C, D are operated by a Pulse Width Modulation (PWM) control 300 (FIG. 2). For example, the outputs OUT-Q and OUT-Q' of the PWM control 300 may be selectively connected to the switches A, B, C, D using a routing circuit 310. The routing circuit 310 includes two multiplexers 320a, 320b which have the OUT-Q and OUT-Q' lines of the PWM control 300 as inputs as well as a mode selection input from a data interface 330. In the construction shown in FIG. 2, the OUT-Q line is connected to input I1 of multiplexer 320a and to input I2 of multiplexer 320b, while the OUT-Q' line is connected to input I2 of multiplexer 320a and to input I1 of multiplexer 320b. The outputs of the multiplexers 320a, 320b are then connected to the switches A, B, C, D.

Figure 4:
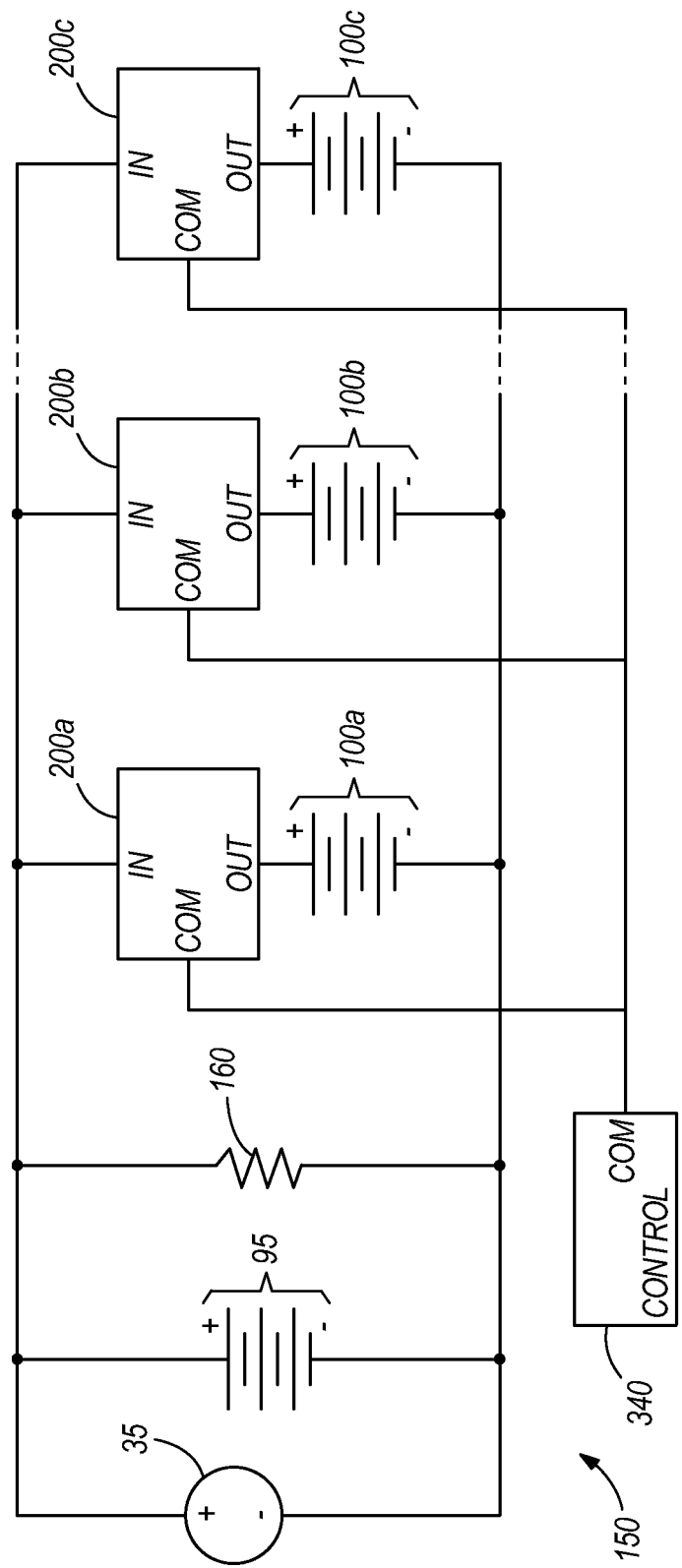
FIG. 4 is a diagram of a portion of a vehicle electrical system, which includes a main vehicle system battery and a plurality of auxiliary batteries, where the auxiliary batteries have a bi-directional battery voltage converter connected in series.

In the construction shown in FIG. 2, multiplexer 320a is connected to switches A and D and multiplexer 320b is connected to switches B and C. Also in the construction shown in FIG. 2, the routing circuit 310 is controlled by the data interface 330, which changes the mode of each of the multiplexers 320a, 320b so as to route either the S1 inputs or the S2 inputs of the respective multiplexers 320a, 320b to the switches A, B, C, D. The data interface 330 includes input/output (I/O) lines, which are connected to a centralized control system 340, such as shown in FIG. 4. The control system 340 may be attached to the vehicle 10 as a standalone unit or as a part of a computer control system for the vehicle 10.

Thus, using the bi-directional battery voltage converter 200 circuit shown in FIG. 2, a single control line (i.e. the "mode" line from the data interface 330), which puts out a binary signal (e.g. a voltage signal that toggles between a low value and a high value such as 0 and 1 volt), can be used to change the positions of the switches A, B, C, D so as to link the inductor L to either the first plurality of batteries 95 or the second plurality of batteries 100. Nevertheless, other methods of controlling the open and closed states of the switches A, B, C, D are also possible.

Depending on the order of charging and discharging of the inductor L, the first plurality of batteries 95 can be used to charge the second plurality of batteries 100, or the second plurality of batteries 100 can be used to charge the first plurality of batteries 95. Further, in place of the first plurality of batteries 100, power from the first power source 40 or the second power source 90 may be used to charge the inductor L and thus provide power to the second plurality of batteries. The charging and discharging of the inductor L is typically performed in a cyclic manner, so as to provide an ongoing source of electrical energy to whichever battery or batteries are receiving the energy. The inductor L undergoes repeated cycles of charging and discharging, which in various constructions occurs at rates of up to 50 kHz or more, with the capacitors $C_{in}$ and $C_{out}$ helping to build charge and to smooth the voltage signal. Using the bi-directional battery voltage converter 200 shown in FIG. 2, the inductor L can deliver an output voltage to one or more of the batteries which is lower than, equal to, or greater than the source voltage connected to the inductor L. The output voltage from inductor L is based on the duty cycles of the switches A, B, C, D, that is, it is based on how much time per cycle the switches A and D are closed and connected to inductor L compared to how much time per cycle the switches B and C are closed and connected to inductor L, as well as the length of the cycle.

In the constructions shown in FIGS. 2-5, the use of the bi-directional battery voltage converter 200 or an electronic switch 210, or both, allows each of the second plurality of batteries 100 to be individually connected or disconnected to the vehicle electrical system 150 for charging or isolation. The circuit shown in FIG. 3 includes current sensing ($I_{sense}$) and voltage sensing ($V_{sense}$) capabilities. In the construction shown in FIG. 3, current sensing is provided by a current-sensing resistor R in series with the inductor L. The output of the current-sensing resistor R is fed into the PWM control. In other constructions, current sensing may be provided by a Hall effect sensor. Voltage sensing ($V_{sense}$) is provided by a line from the "OUTPUT/INPUT" to the PWM control. The construction of FIG. 3 also includes voltage set ($V_{set}$) and current set ($I_{set}$) controls on the data interface 330 and PWM control 300 to permit setting of particular voltage and current levels for charging and discharging the particular battery, e.g. one of the second plurality of batteries 100, that is connected to the circuit.

FIG. 4 shows a diagram of a vehicle electrical system 150 according to a construction of the invention in which the second plurality of batteries 100 is coupled to the electrical system of a vehicle using the bi-directional battery voltage converter 200. Although FIG. 4 shows three batteries 100a-c, any number may be used. Each of the second plurality of batteries 100a-c can be individually charged by the vehicle electrical system 150, for example, by one or both of the vehicle alternator 35 and at least one of the first plurality of batteries 95. The various elements of the bi-directional battery voltage converters 200 shown in FIGS. 2 and 3, including the switches A, B, C, D, the inductor L, the capacitors $C_{in}$ and $C_{out}$, the routing circuit 310, the PWM control 300, and the data interface 330, may be distributed between the control system 340 unit and the bi-directional battery voltage converter 200a-200c units of FIG. 4. One non-limiting example is that the PWM control 300, the routing circuit 310, and the data interface 300 may be housed in the same unit as the control system 340.

In various constructions, charging is applied to each of the second plurality of batteries 100 based on the battery's state of discharge. For example, a "bulk" charging stage, which supplies a fixed current to rapidly recharge to a partial-charge point, can be used with batteries that are relatively depleted, while an "adsorption" stage, in which the voltage is held constant while supplying varying levels of current, can be used to complete charging. Finally, a "float" charging stage, which measures the battery voltage and recharges the battery as needed to keep the battery within a predetermined voltage range, can be used to maintain battery charge over an extended period of time. Other battery charging stages are possible and are encompassed within the invention. Using a multiple stage charging method such as that described above is generally the most rapid way to recharge a battery while maintaining maximum battery life.

A drawback of hardwiring multiple batteries in parallel into a single operational unit is that all of the batteries are charged simultaneously. Under certain conditions (e.g. if one or more of the batteries has become very depleted or if the load of the vehicle electrical system is large), recharging of all of the batteries may draw so much power from the vehicle alternator 35 that the alternator 35 is unable to provide sufficient power to the connected electrical loads.

Figure 5:
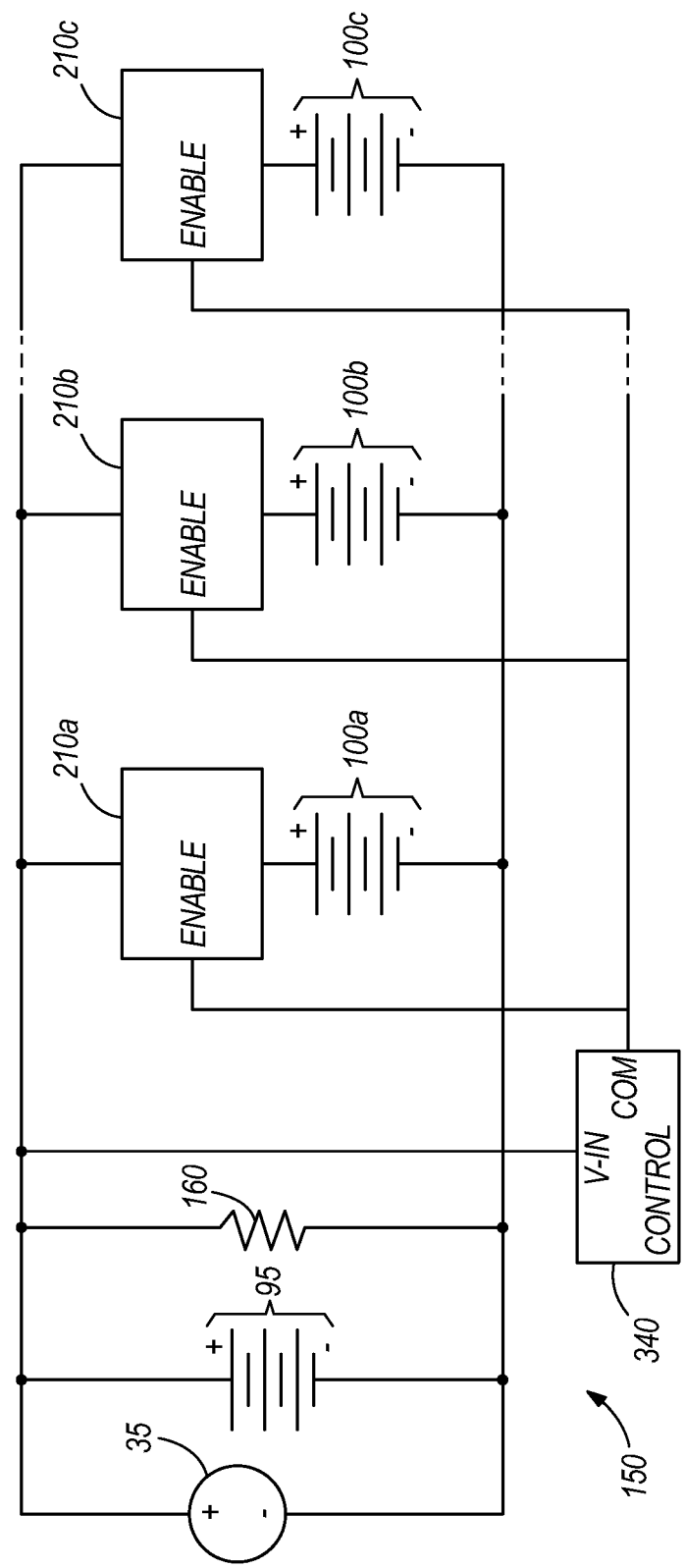
FIG. 5 is a diagram of a portion of a vehicle electrical system, which includes a main vehicle system battery and a plurality of auxiliary batteries, where the auxiliary batteries have an electronic switch connected in series.

Thus, in one construction, each of the second plurality of batteries 100 is separately connected to the vehicle electrical system during the recharging phase in order to prevent too much current from being drawn from the alternator 35 through the vehicle electrical system 150. In one construction, each of the second plurality of batteries 100 can be coupled to the vehicle electrical system using an electronic switch 210 (FIG. 5). In this and other constructions which reference the use of an electronic switch 210, however, each of the second plurality of batteries 100 can be coupled to the vehicle electrical system 10 using the bi-directional battery voltage converter 200 (FIG. 4) instead of an electronic switch 210. The bi-directional battery voltage converter 200 can operate as a switch, for example by not alternating the open and closed states of the switches A, B, C, D, or by including a mode in which all of the switches A, B, C, D are open.

In various constructions, the electronic switches 210 are controlled by the control system 340, which also monitors the voltage of the vehicle electrical system 150. Opening a particular electronic switch 210 isolates the battery associated therewith. Thus, when the alternator 35 is operating (e.g. if the prime mover 25 is in the "On" state) it provides charging current for the connected load 160, where in some constructions the load 160 may include one or more of the first plurality of batteries 95, insofar as these are being charged.

In one construction, the control system 340 initially opens (i.e. disables/disconnects) each electronic switch 210 so as to prevent current into or out of each of the respective second plurality of batteries 100. The control system 340 then closes (i.e. enables/connects) each switch 210 one at a time, thereby connecting each of the second plurality of batteries 100 in parallel with the vehicle electrical system 150. The control system 340 monitors the voltage (V-IN; see FIG. 5) of the vehicle electrical system 150 each time one of the electronic switches 210 is closed and an additional battery is connected. If connection of a particular battery causes the voltage of the vehicle electrical system 150 to traverse a threshold then the electronic switch 210 associated with the particular battery is opened so as to disconnect the battery from the vehicle electrical system 150. In one example, the threshold may be traversed when the voltage drops below a predetermined value (e.g. below 7 volts in a 12 volt system). An excessive drop in voltage may indicate that the alternator 35 or other power source has been overloaded. In other constructions, a low voltage value may be based on a voltage difference from a starting or nominal value. In still other constructions, the low voltage value may be determined as a percentage or ratio of a starting or nominal value.

Once each of the electronic switches 210 has been tested and left in an open or closed state, then any remaining switches 210 that were left open (e.g. due to the system voltage dropping too low when the switch was closed) are re-tested. Each of the remaining open switches 210 is closed one at a time, and the voltage of the vehicle electrical system 150 is then measured by the control system 340 to determine whether the voltage is too low, as discussed above. This procedure is repeated until all of the switches 210 are closed.

In some constructions, the voltage of the vehicle electrical system 150 is continuously monitored and if the voltage drops (e.g. if an additional electrical load such as the HVAC system 55 is added to the vehicle electrical system 150), then one or more electronic switches 210 may be opened until the voltage increases to an acceptable value. While the alternator 35 is operating, the electrical load 160 connected to the vehicle electrical system 150 may change due to factors such as one or more batteries becoming sufficiently charged so that it draws less power from the alternator 35, or by changes in the use of devices that consume power, such as lights or the HVAC system 55.

Another possible drawback of hardwiring multiple batteries in parallel into a single operational unit is that there may be slight imbalances in the electrical properties within each battery. These imbalances can lead to other problems including a large variance of current delivered by each battery, reduced battery lifetime, and possible degradation of all connected batteries due to the presence of one or more defective batteries in the vehicle electrical system 150.

Thus, various constructions of the system include methods of balancing the current that is supplied by each of the second plurality of batteries 100 to the vehicle electrical system 150. The method can be implemented using a system such as that shown in FIG. 4 in which each of the second plurality of batteries 100 is connected to the vehicle electrical system 150 using a bi-directional battery voltage converter 200 circuit such as that shown in FIG. 3.

Figure 3:
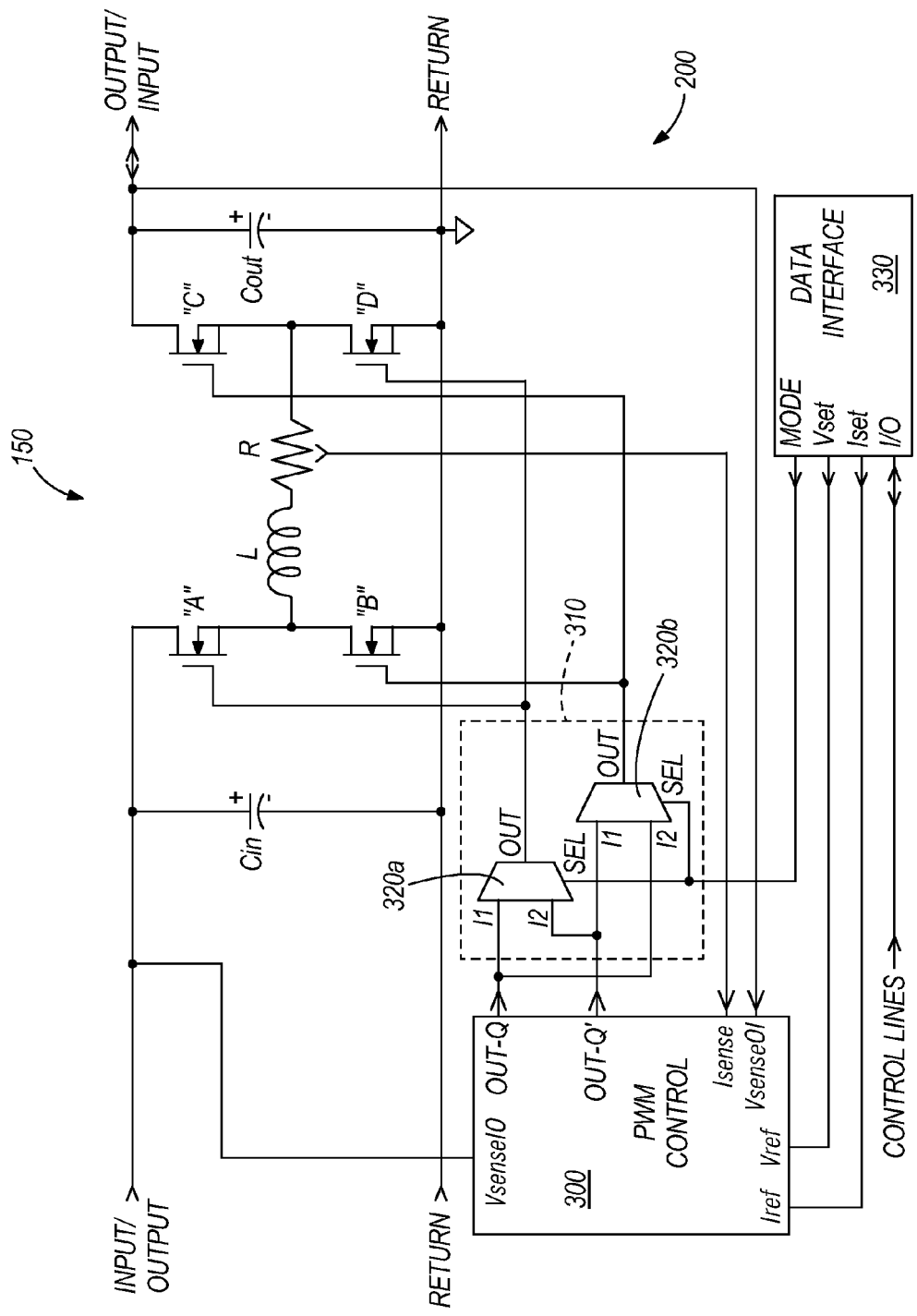
FIG. 3 is a diagram of a portion of a vehicle electrical system, which includes a bi-directional battery voltage converter circuit.

As discussed above, in certain constructions the bi-directional battery voltage converter 200 includes a data interface 330 which in turn exchanges commands from the control system 340 (FIGS. 3 and 4). The control system 340 monitors the voltage ($V_{sense}$) and current ($I_{sense}$) conditions of each bi-directional battery voltage converter 200. In various constructions, the control system 340 then issues commands to each bi-directional battery voltage converter 200 to operate with parameters such that each of the second plurality of batteries 100 delivers a proportionate amount of the cumulative total current that is supplied to the connected electrical load 160. In the case where each battery has the same nominal characteristics, then appropriate commands are sent to each bi-directional battery voltage converter 200 such that each of the second plurality of batteries 100 delivers an equal amount of current to the connected electrical load 160. For example, if the amount of current being delivered by a first battery is greater than the current being supplied by any of the other batteries (e.g. due to the first battery having a lower internal resistance or being charged up more than the other batteries), then the duty cycle of the bi-directional battery voltage converter 200 associated with the first battery may be adjusted to reduce the amount of current being delivered by the first battery.

In certain constructions, the voltage level of each of the second plurality of batteries 100 is monitored and the bi-directional battery voltage converter 200 associated with a given one of the second plurality of batteries 100 is disabled if the battery is too deeply discharged, e.g. if the terminal voltage of the battery drops below a predetermined value, for example below 10.5 volts on a battery rated at 12 volts. If this were to happen, then the parameters for each of the bi-directional battery voltage converters 200 connected to the remaining functional batteries would be adjusted by the control system 340 accordingly (e.g. by altering the duty cycle of the bi-directional battery voltage converter 200) so as to supply proportionate amounts of current to the connected electrical load 160.

Still another possible drawback of hardwiring multiple batteries in parallel into a single operational unit is that all of the batteries are discharged concurrently when the prime mover 25 is turned off and the alternator 35 is no longer providing power to the vehicle electrical system 150. Thus, after a period of time supplying the electrical load requirements of the vehicle 10, all of the batteries may become discharged, possibly leaving no battery power available for critical loads such as powering the starter motor to re-start the vehicle 10.

Therefore, in various constructions the system includes methods of maintaining a minimum charge level in one or more of the second plurality of batteries 100. In one construction, one or more of the second plurality of batteries 100 has an electronic switch 210 connected in series therewith so that when the switch 210 is opened, the battery is isolated from the vehicle electrical system 150 (FIG. 5). As discussed above, the bi-directional battery voltage converter 200 can also serve the role of an electrical switch.

Figure 6:
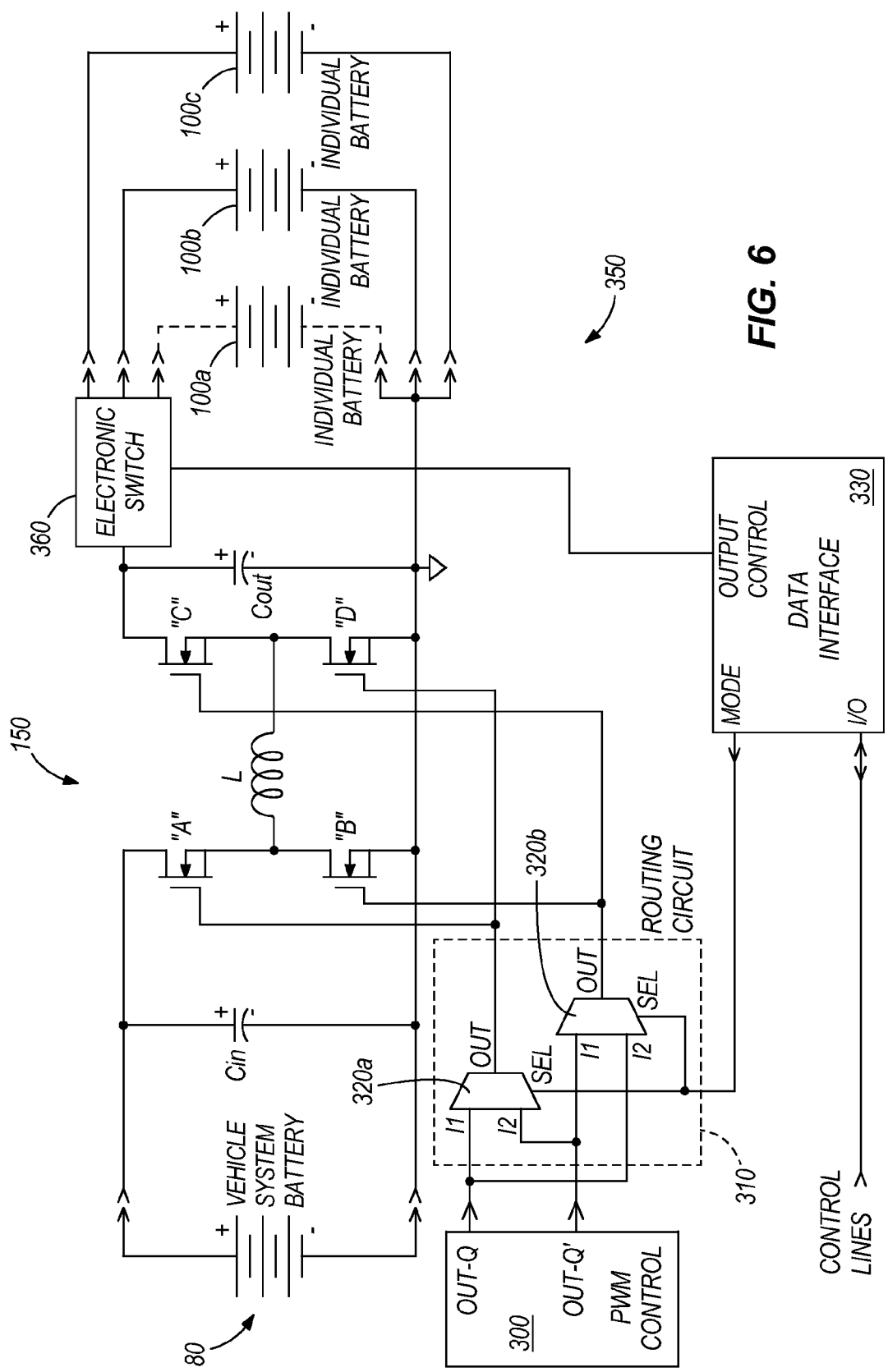
FIG. 6 is a diagram of a portion of a vehicle electrical system, which includes a bi-directional multi-battery voltage converter circuit.
Figure 7:
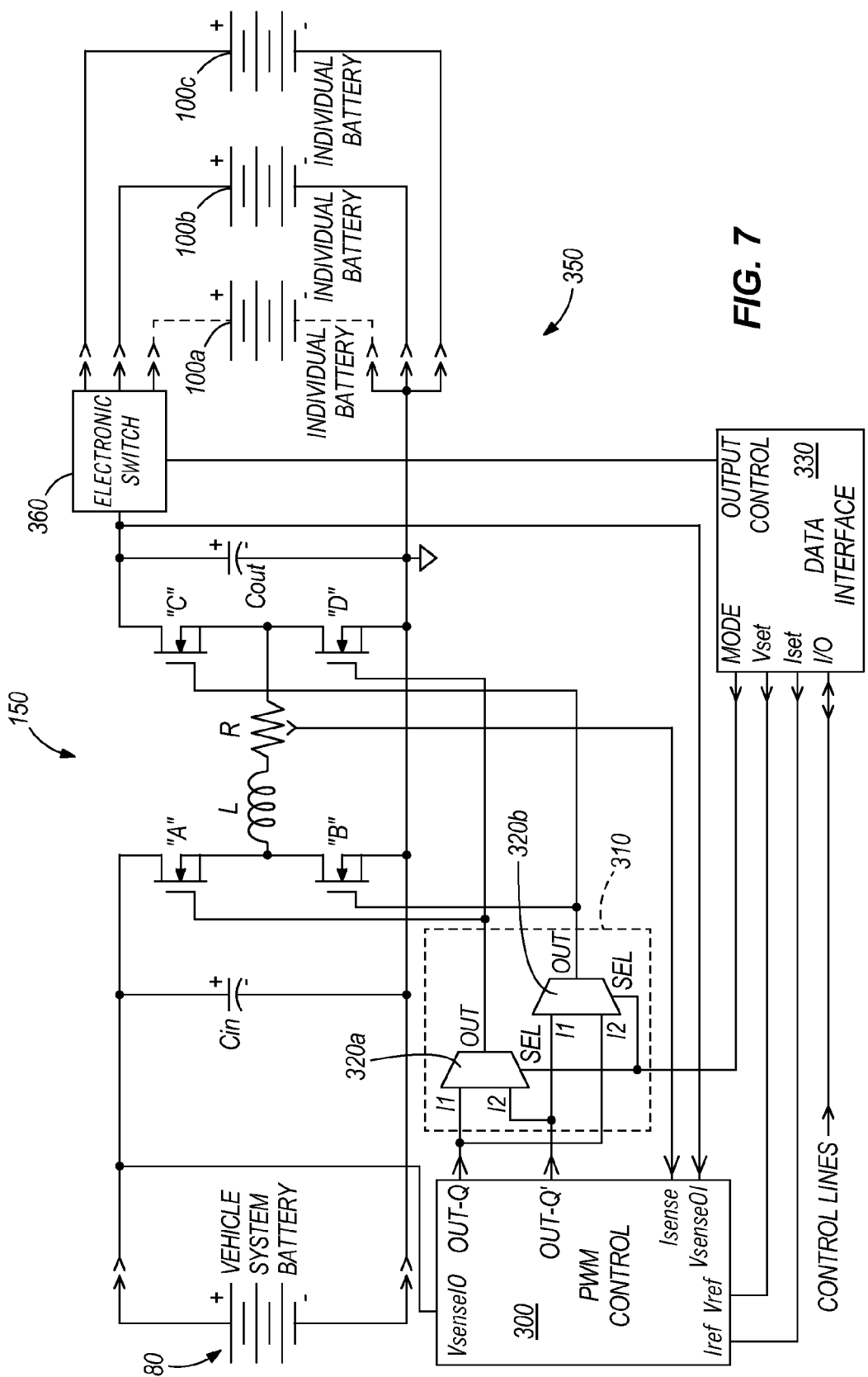
FIG. 7 is a diagram of a portion of a vehicle electrical system, which includes a bi-directional multi-battery voltage converter circuit.
Figure 8:
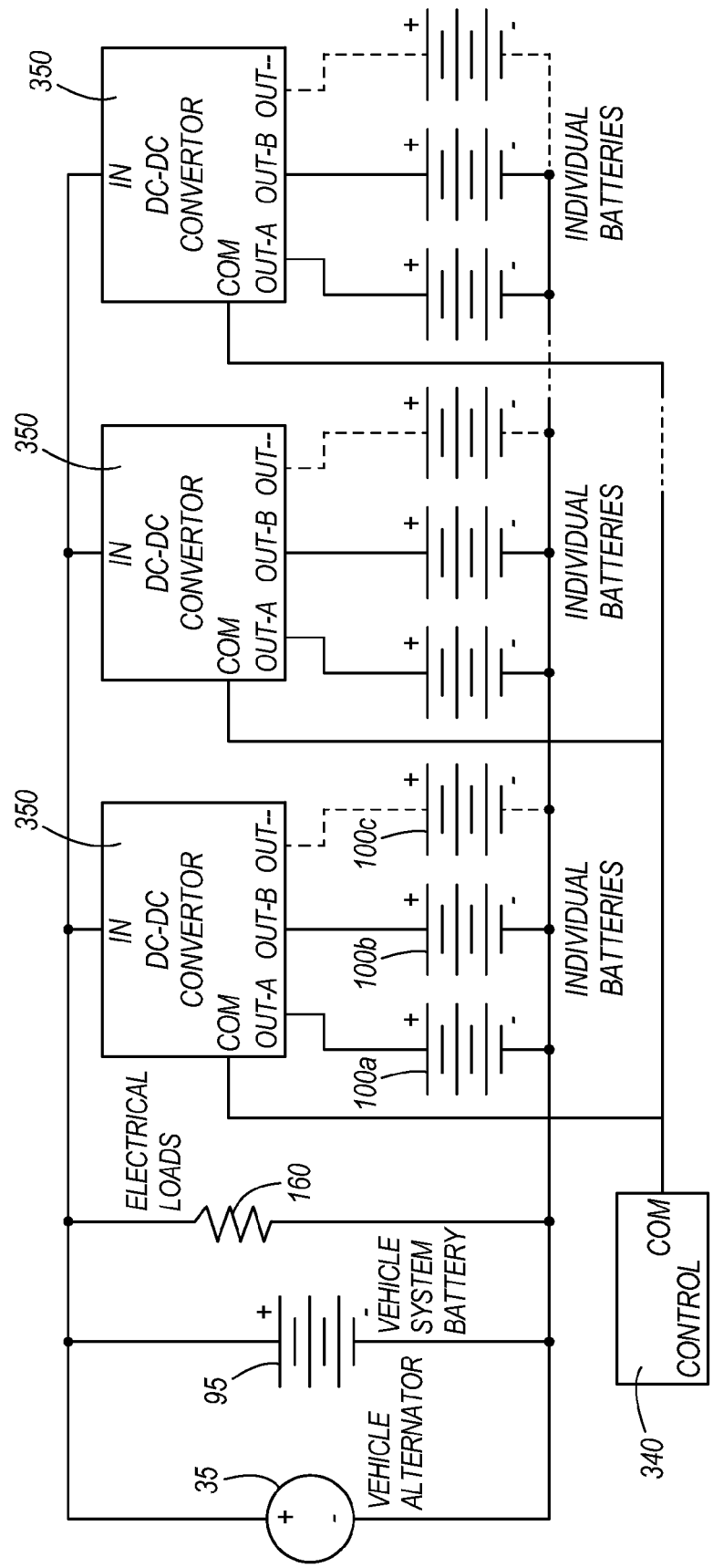
FIG. 8 is a diagram of a portion of a vehicle electrical system, which includes a main vehicle system battery and a plurality of auxiliary batteries, where the auxiliary batteries have a bi-directional multi-battery voltage converter connected in series.

FIGS. 6, 7 and 8 illustrate still other constructions of a vehicle electrical system 150 according to the invention. In these constructions, multiple batteries are associated with a bi-directional multi-battery voltage converter 350. In the illustrated constructions of FIGS. 6, 7, and 8, three batteries 100 are associated with each bi-directional multi-battery voltage converter 350, though in other constructions fewer batteries or more batteries may be associated with each converter.

In the construction illustrated in FIG. 6, a bi-directional multi-battery voltage converter 350 functions in a substantially similar manner to the bi-directional battery voltage converter 200 illustrated in FIG. 2 and described above. Unlike the construction of FIG. 2, however, an electronic switch 360 is provided between MOSFET switch C and the associated batteries 100. The electronic switch 360 selectively connects between one or more individual batteries by selectively energizing or de-energizing relays associated with each battery. The relays are used to switch between multiple separate auxiliary batteries 100.

The electronic switch 360 is controlled by an output control of the data interface 330. The signal of the output control controls the electronic switch 360 to select which battery 100 is to be charged, discharged or isolated depending on state of charge and other factors.

In the construction shown in FIG. 7, current sensing is provided by a current-sensing resistor R in series with the inductor L. The output of the current-sensing resistor R is fed into the PWM control. In other constructions, a Hall effect sensor may be substituted for the current-sensing resistor R. A voltage sense signal ($V_{sense}$) is provided by a line from the "OUTPUT/INPUT" to the PWM control. $V_{sense}$ may also be provided by a line from the "INPUT/OUTPUT" to the PWM control. The construction of FIG. 7 also includes voltage set ($V_{set}$) and current set ($I_{set}$) controls on the data interface 330 and PWM control 300 to permit setting of particular voltage and current levels for charging and discharging the particular battery, e.g. one of the second plurality of batteries 100, that is connected to the circuit.

FIG. 8 illustrates an arrangement of bi-directional multi-battery voltage converters 350 which is similar to that illustrated in FIG. 4. Instead of having one battery 100 associated with one bi-directional battery voltage converter 200, a plurality of batteries 100 is associated with each bi-directional multi-battery voltage converter 350.

Figure 9:
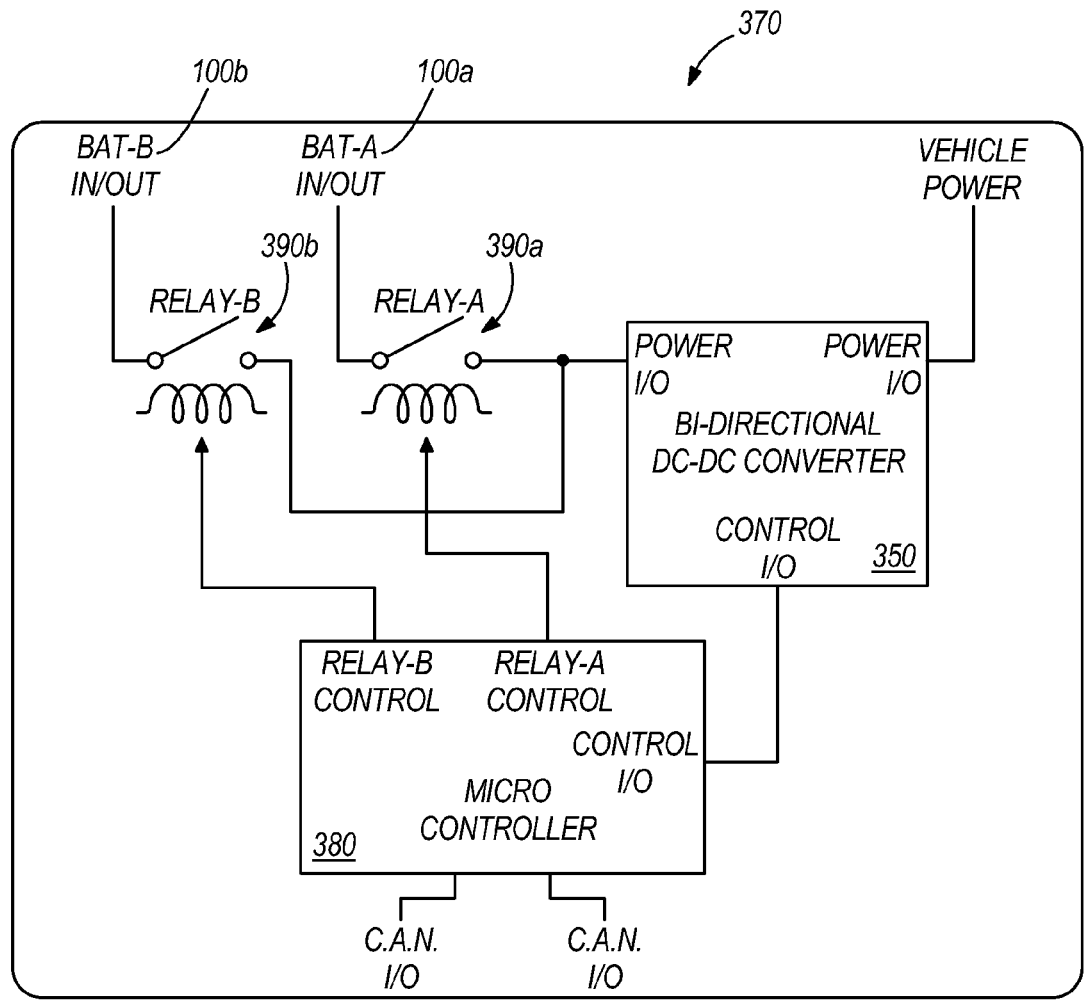
FIG. 9 is a diagram of a bi-direction multi-battery voltage converter circuit module.
Figure 10:
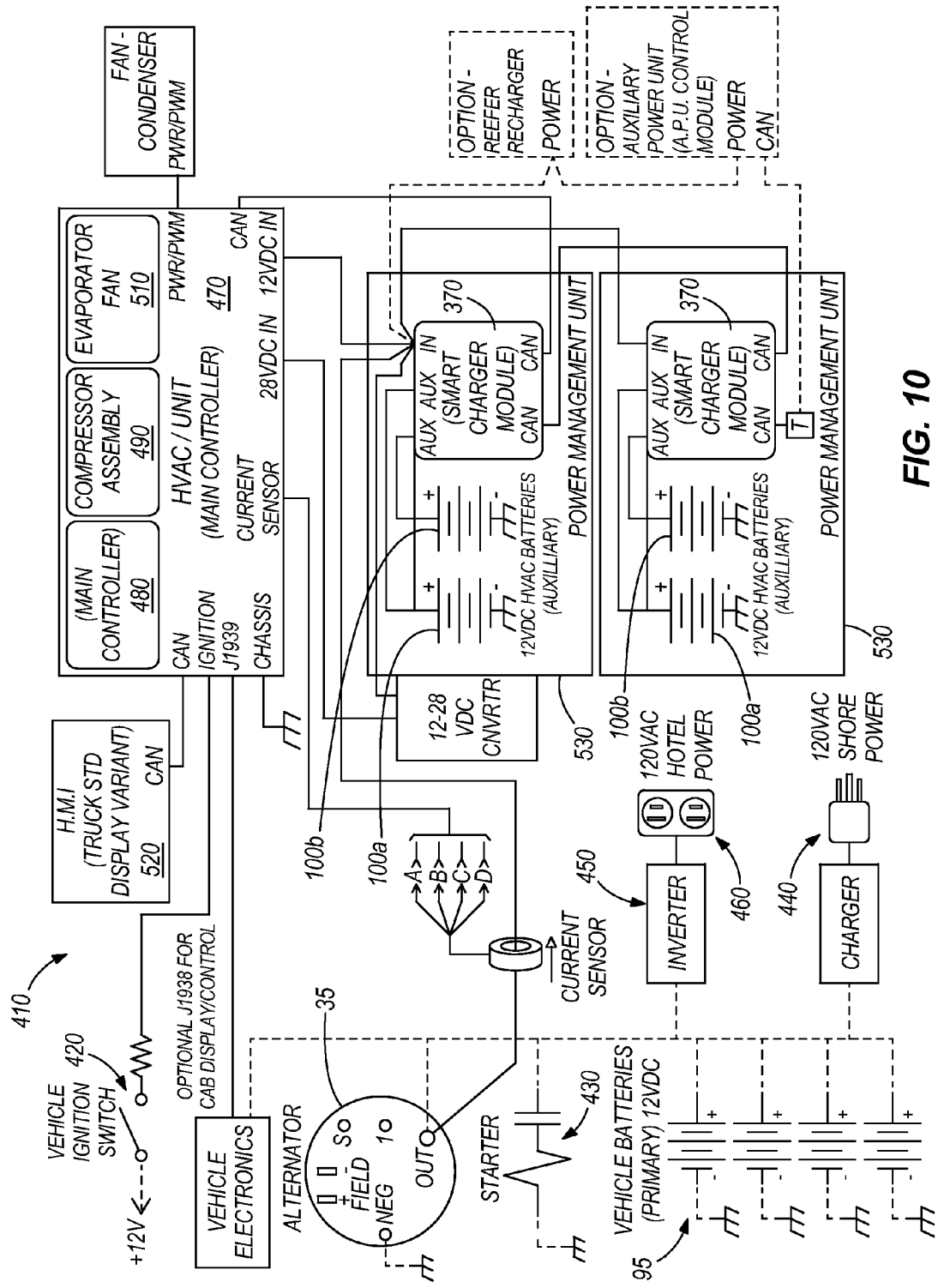
FIG. 10 is a diagram of a vehicle electrical system including the bi-directional multi-battery voltage converter circuit module of FIG. 9.

FIGS. 9-10 illustrate still another embodiment of the invention. In this construction, a bi-directional multi-battery voltage converter 350, similar to that of FIGS. 6-8, is incorporated into a "Smart Charging Module" or SCM 370. The SCM 370 is a construction of a bi-directional DC-DC converter which can transfer energy between a primary power source (e.g., an alternator) and either of two separate auxiliary batteries 100a, b. In other constructions, the SCM may be configured to switch between more than two auxiliary batteries.

As shown in FIG. 9, a micro-controller 380 is operable to selectively energize or de-energize a first relay 390a and a second relay 390b. In other constructions, other electronic switching devices may be substituted for the relays 390a and 390b. In the illustrated constructions, relay 390a is associated with battery 100a, and relay 390b is associated with battery 100b. When either relay is energized, the associated battery is electrically coupled to the bi-directional battery voltage converter by the closing of the relay. The micro-controller 380 serves a switching function similar to that of the electronic switch 360 in FIGS. 7 and 8. The micro-controller 380 is configured such that either relay may be selectively energized, but both relays cannot be energized simultaneously. In some constructions, the micro-controller may also incorporate the pulse-width modulation 300 and data interface 330 functions of other constructions.

FIG. 10 illustrates a vehicle electrical system 410 incorporating multiple SCMs 370. The vehicle electrical system 410 has an ignition switch 420, a starter 430, a plurality of vehicle batteries 95, and a connection for external 120 VAC shore power 440. An inverter 450 and socket 460 are provided for supplying external 120 VAC loads. An alternator 35 provides power to the electrical system when a prime mover is operating, such as when the vehicle is on the road or idling.

An all-electric HVAC unit 470 is provided, which may be powered by the SCMs 370 when the prime mover 25 is stopped and shore power is unavailable. The HVAC unit 470 incorporates a main controller 480, a compressor assembly 490, and an evaporator fan 510. A human machine interface 520 provides user input to the HVAC unit 470 to control such functions as temperature and fan speed.

Each SCM 370 and an associated pair of batteries 100a, b are incorporated into a power management unit 530. In the illustrated vehicle electrical system 410, two power management units 530 are provided.

The SCM 370 can operate in one of three states. When in a charge mode, the SCM 370 will charge batteries 100a, b using vehicle batteries 95 and alternator 35 as the power source. When in a discharge mode, the SCM 370 will deliver power from batteries 100a, b to the vehicle electrical system 410 and associated loads, including the HVAC unit 470. The SCM 370 can also be operated in a null mode, where there will be no current flowing between the auxiliary batteries 100a, b and the rest of the vehicle electrical system 410.

The SCM 370 mode can be determined by the main controller 480 of the HVAC unit 470. When the vehicle ignition switch 420 is closed, the main controller 480 will switch the SCMs 370 to the charging mode. When the vehicle ignition switch is open, the main controller will switch the SCMs to a discharging mode. External inputs, such as a user input to the human machine interface 520, can manually select the null, charge, or discharge modes as well.

Figure 11:
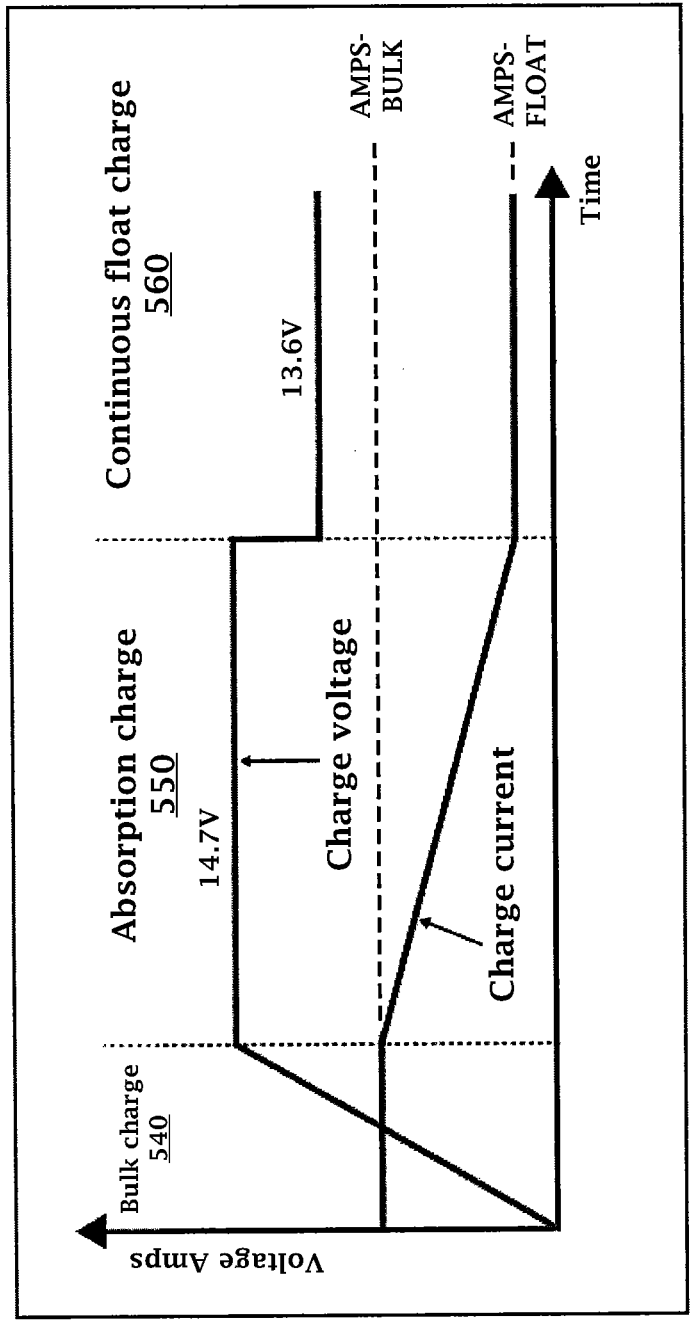
FIG. 11 is a graph of battery charging voltage and current according to one aspect of the vehicle electrical system of FIG. 10.

Additionally the SCM 370 functions as a three-stage charger while in the charge mode. The profile of the typical three-stage charger is shown in FIG. 11. In the bulk stage 540, charge current is approximately constant, while charge voltage rises. In the absorption stage 550, charge current decreases while the charge voltage is held at a constant, elevated level. In a float stage 560, both charge voltage and current are held constant.

Figure 12:
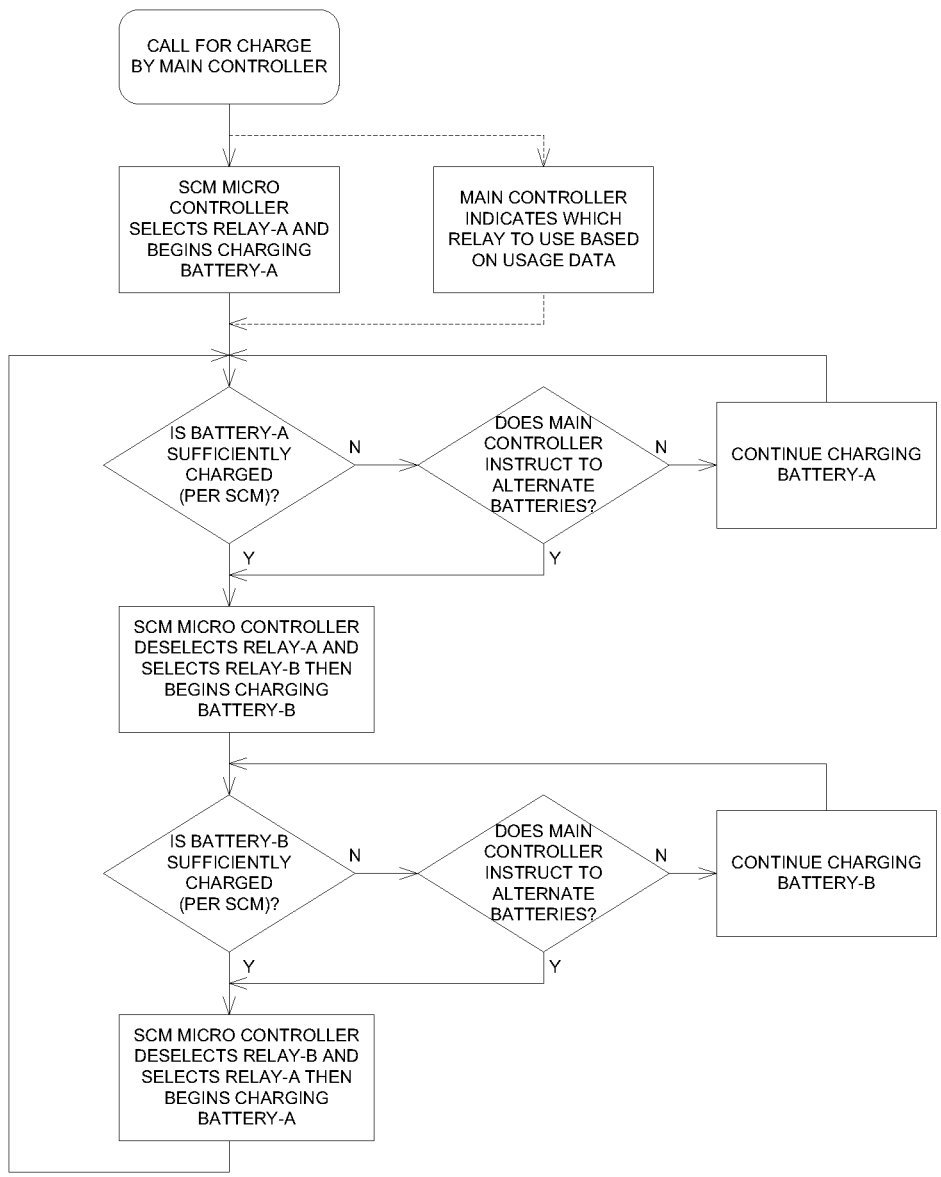
FIG. 12 is a control flowchart for one aspect of the vehicle electrical system of FIG. 10 while in a charging mode.

FIG. 12 is a flow chart illustrating the battery selection logic of the main controller 480 and SCM 370 in the charge mode. The main controller 480 enters the charge mode upon the ignition switch 420 closing. The SCM 370 is set up to energize relay 390a first, thereby connecting battery 100a. In some embodiments, the main controller 480 may incorporate a memory module which tracks usage data for each battery. If the main controller 480 determines that battery 100a received charging priority over battery 100b too often, the main controller 480 may override the SCM 370 and select battery 100b to charge first.

In certain embodiments, the main controller 480 may additionally be programmed with a rapid recharge function. In these embodiments, a single battery 100a or 100b of one SCM 370 may be preferentially charged by de-energizing all other relays 390 associated with other batteries 100. In some embodiments, the main controller 480 may prioritize charging of a battery 100 with the lowest state of charge (i.e., the battery most in need of charging). Alternatively, the main controller 480 may prioritize charging of a battery 100 with the highest state of charge (i.e., the battery that can be fully charged in the shortest period of time).

After battery 100a has charged for a period, SCM 370 determines state of charge. If the battery is fully charged, the SCM will de-energize relay 390a and energize relay 390b, thereby connecting battery 100b for charging. Even if the battery is not fully charged, the main controller 480 may switch to charging battery 100b based on other criteria such as balancing state of charge. The iterative process continues until both batteries are fully charged.

Figure 13:
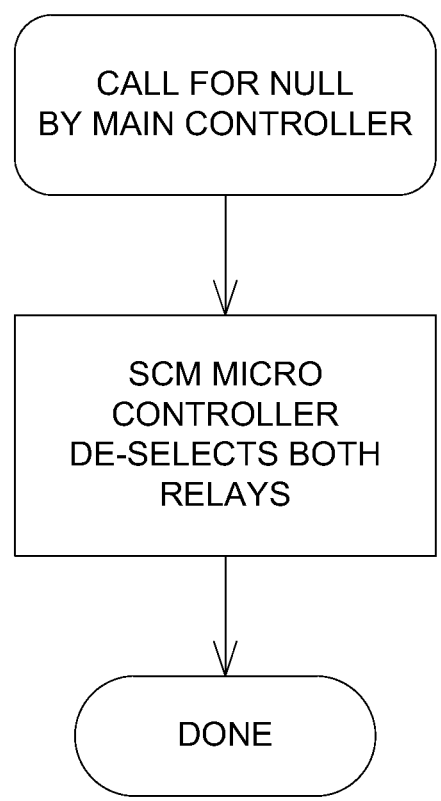
FIG. 13 is a control flowchart for one aspect of the vehicle electrical system of FIG. 10 while in a null mode.

FIG. 13 is a flow chart illustrating entry into the null mode. When the null mode is selected, the main controller 480 signals the SCM to de-energize the relays 390a and 390b associated with both batteries 100a and 100b.

Figure 14:
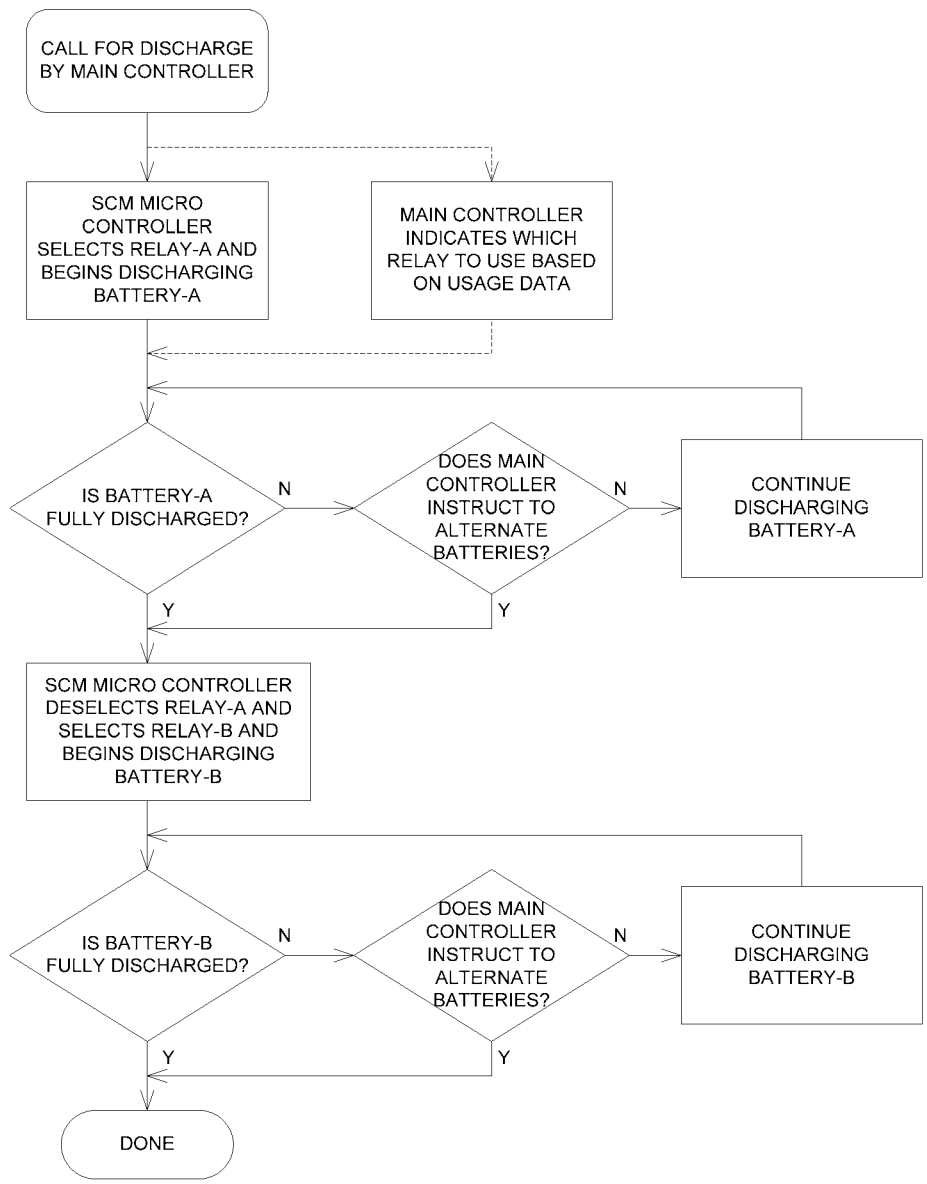
FIG. 14 is a control flowchart for one aspect of the vehicle electrical system of FIG. 10 while in a discharging mode.

FIG. 14 is a flow chart illustrating the battery selection logic of the main controller 480 and SCM 370 in the discharge mode. The main controller 480 enters the discharge mode upon the ignition switch 420 opening. The SCM 370 is set up to energize relay 390a first, thereby connecting battery 100a to discharge first. If the main controller 480 determines that battery 100a has a greater discharge history than battery 100b, the main controller 480 may override the SCM 370 and select battery 100b to charge first.

After battery 100a has discharged for a period, SCM 370 determines state of charge. If the battery is fully discharged, the SCM will de-energize relay 390a and energize relay 390b, thereby connecting battery 100b for discharging. Even if battery 100a is not fully discharged, the main controller 480 may switch to charging battery 100b based on other criteria such as balancing state of charge or maximizing battery life by preventing deep discharges. The iterative process continues until both batteries are fully discharged or the main controller returns to the charge or null mode.

The SCM 370 and/or main controller 480 may be programmed with additional battery switching criteria, such as a current limit. A current limit point protects the auxiliary batteries from an excessive discharge rate and promotes current sharing between the auxiliary batteries.

Accordingly, the invention provides a new and useful control system for electrical storage elements of a vehicle, which includes a system for controlling power into and out of the electrical storage elements.

The invention claimed is:

1. An electrical system for a vehicle, comprising:
a system bus;
an alternator supplying a current to the system bus when mechanically driven by a prime mover;
an ignition switch selecting an operational state of the electrical system;
a primary battery connected to the system bus;
a first auxiliary battery module connected to the system bus comprising
a first auxiliary battery,
a second auxiliary battery,
a bi-directional battery voltage converter,
a module controller selectively connecting one of the first auxiliary battery, and the second auxiliary battery to the bi-directional battery voltage converter; and
a main system controller operating the first auxiliary battery module in one of
a null mode, wherein the first auxiliary battery and the second auxiliary battery are disconnected from the electrical system,
a charging mode, wherein one of the first auxiliary battery and the second auxiliary battery receives a current via the bi-directional battery voltage converter, and
a discharging mode, wherein one of the first auxiliary battery and the second auxiliary battery supplies a current via the bi-directional battery voltage converter,
wherein the bi-directional battery voltage converter comprises an inductor,
a first switch selectively coupling the inductor to one of the first auxiliary battery and the second auxiliary battery,
a second switch selectively coupling the inductor to one of the first auxiliary battery and the second auxiliary battery,
a third switch selectively coupling the inductor to the system bus,
a fourth switch selectively coupling the inductor to the system bus, and
a routing circuit controlled by the module controller and connected to each of the first, second, third, and fourth switches, the routing circuit controllably directing opening and closing of each of the first switch, the second switch, the third switch, and the fourth switch.

2. The vehicle electrical system of claim 1, wherein the charging mode operates in multiple charging stages, comprising
a bulk stage, wherein a charge current is held substantially constant,
an absorption stage, wherein a charge voltage is held substantially constant, and
a float stage, wherein both the charge voltage and the charge current are held substantially constant.

3. The vehicle electrical system of claim 1, wherein the routing circuit comprises a pulse-width modulator.

4. The vehicle electrical system of claim 1, wherein the module controller preferentially connects the first auxiliary battery to the vehicle electrical system upon the ignition switch closing.

5. The vehicle electrical system of claim 1, further comprising a memory storing usage data of at least the first auxiliary battery and the second auxiliary battery.

6. The vehicle electrical system of claim 5, wherein the module controller preferentially connects the first auxiliary battery to the vehicle electrical system in response to the ignition switch closing and wherein the system controller overrides the module controller in order to preferentially connect the second auxiliary battery to the vehicle electrical system in response to the ignition switch closing, based upon the usage data.

7. The vehicle electrical system of claim 1, further comprising:
a first relay selectively connecting the first battery to the bi-directional battery voltage converter;
a second relay selectively connecting the second battery to the bi-directional battery voltage converter, wherein the module controller is configured to selectively energize one of the first relay and the second relay.

8. The vehicle electrical system of claim 1, wherein the module control is configured to monitor a first parameter related to a state of charge of the first battery and a second parameter related to a state of charge of the second battery.

9. The vehicle electrical system of claim 8, wherein the module control disconnects the first auxiliary battery when the first parameter traverses a threshold value.

10. The vehicle electrical system of claim 9, wherein the module control connects the second auxiliary battery when the first parameter traverses the threshold value.

11. The vehicle electrical system of claim 8, wherein the module control alternately connects and disconnects the first auxiliary battery and the second auxiliary battery to the bi-directional battery voltage converter in order to balance the state of charge of the first battery and the state of charge of the second battery while operating in the discharging mode.

12. The vehicle electrical system of claim 1, further comprising:
a second auxiliary battery module comprising
a third auxiliary battery,
a fourth auxiliary battery,
a second bi-directional battery voltage converter, and
a second module controller selectively connecting one of the third auxiliary battery and the fourth auxiliary battery to the second bi-directional battery voltage converter.

13. A battery module for use with a vehicle electrical system, comprising:
a bi-directional battery voltage converter;
a first battery;
a second battery;
a first relay selectively connecting the first battery to the bi-directional battery voltage converter;
a second relay selectively connecting the second battery to the bi-directional battery voltage converter; and
a controller selectively energizing the first relay, selectively energizing the second relay, and controlling a direction of current through the bi-directional battery voltage converter,
wherein the bi-directional battery voltage converter comprises
an inductor
a first switch selectively coupling the inductor to one of the first auxiliary battery and the second auxiliary battery,
a second switch selectively coupling the inductor to one of the first auxiliary battery and the second auxiliary battery,
a third switch selectively coupling the inductor to the vehicle electrical system,
a fourth switch selectively coupling the inductor to the vehicle electrical system, and
a routing circuit controlled by the controller and connected to each of the first, second, third, and fourth switches, the routing circuit selectively opening and closing each of the first switch, the second switch, the third switch, and the fourth switch, charging the inductor from one of the vehicle electrical system and the battery and discharging the inductor to the other of the vehicle electrical system and the battery.

14. The battery module of claim 13, wherein the controller monitors a first parameter related to a state of charge of the first battery and a second parameter related to a state of charge of the second battery.

15. The vehicle electrical system of claim 14, wherein the controller disconnects the first auxiliary battery when the first parameter traverses a threshold value.

16. The vehicle electrical system of claim 15, wherein the controller connects the second auxiliary battery when the first parameter traverses the threshold value.

* * * * *